US011968489B1

(12) United States Patent
Zhang et al.

(10) Patent No.: US 11,968,489 B1
(45) Date of Patent: Apr. 23, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/499,197

(22) Filed: Oct. 31, 2023

Related U.S. Application Data

(63) Continuation of application No. PCT/CN2023/083540, filed on Mar. 24, 2023.

(30) Foreign Application Priority Data

Oct. 28, 2022 (CN) ............................ 202211336918
Dec. 1, 2022 (CN) ............................ 202223239628
(Continued)

(51) Int. Cl.
*H04R 25/00* (2006.01)
*H04R 1/10* (2006.01)

(52) U.S. Cl.
CPC ........... *H04R 1/1008* (2013.01); *H04R 1/105* (2013.01)

(58) Field of Classification Search
CPC ...... H04R 2460/13; H04R 9/06; H04R 11/02; H04R 2400/03; H04R 1/1075
See application file for complete search history.

(56) References Cited

U.S. PATENT DOCUMENTS

2007/0009133 A1 1/2007 Gerkinsmeyer
2016/0134957 A1* 5/2016 Jentz ...................... H04R 1/105 381/380
2020/0137476 A1 4/2020 Shinmen et al.

FOREIGN PATENT DOCUMENTS

CN 203968330 U 11/2014
CN 209201336 U 8/2019
(Continued)

OTHER PUBLICATIONS

International Search Report in PCT/CN2023/083540 dated Jul. 10, 2023, 7 pages.
(Continued)

*Primary Examiner* — Amir H Etesam
(74) *Attorney, Agent, or Firm* — METIS IP LLC

(57) ABSTRACT

The present disclosure relates to an earphone, comprising: a sound production component, at least a portion of the sound production component extending into a concha cavity; ear hook disposed between an auricle and a head of the user, extending toward a side of the auricle away from the head, and connecting the sound production component; in a non-wearing state, the ear hook and the sound production component form a first projection on a first plane comprising an outer contour, a first end contour, an inner contour, and a second end contour, the outer contour, the first end contour, the second end contour, and a tangent segment connecting the first end contour and the second end contour define a first closed curve, a ratio of a projection area of the sound production component on the first plane to a first area of the first closed curve is between 0.25 and 0.4.

20 Claims, 17 Drawing Sheets

(30) Foreign Application Priority Data

| | | | |
|---|---|---|---|
| Dec. 30, 2022 | (WO) | ................ | PCT/CN2022/144339 |
| Mar. 2, 2023 | (WO) | ................ | PCT/CN2023/079401 |
| Mar. 2, 2023 | (WO) | ................ | PCT/CN2023/079412 |

(56) References Cited

FOREIGN PATENT DOCUMENTS

| | | | |
|---|---|---|---|
| CN | 210053540 | U | 2/2020 |
| CN | 212909891 | U | 4/2021 |
| CN | 113301463 | A | 8/2021 |
| CN | 113573215 | A | 10/2021 |
| CN | 114286228 | A | 4/2022 |
| CN | 114286240 | A | 4/2022 |
| CN | 114390394 | A | 4/2022 |
| CN | 114554339 | A | 5/2022 |
| CN | 115175069 | A | 10/2022 |
| JP | 2010193344 | A | 9/2010 |
| WO | 2019017036 | A1 | 1/2019 |
| WO | 2022111485 | A1 | 6/2022 |

OTHER PUBLICATIONS

Written Opinion in PCT/CN2023/083540 dated Jul. 10, 2023, 9 pages.

* cited by examiner

EARPHONES

CROSS REFERENCE TO RELATED APPLICATIONS

This application is a continuation of International Application No. PCT/CN2023/083540, filed on Mar. 24, 2023, which claims priority to Chinese application No. 202211336918.4, filed on Oct. 28, 2022, Chinese application No. 202223239628.6, filed on Dec. 1, 2022, International application No. PCT/CN2022/144339, filed on Dec. 30, 2022, International application No. PCT/CN2023/079401, filed on Mar. 2, 2023, and International application No. PCT/CN2023/079412, filed on Mar. 2, 2023, the entire contents of each of which are incorporated herein by reference.

TECHNICAL FIELD

The present disclosure relates to the field of acoustic technology, and in particular, to an earphone.

BACKGROUND

With the development of acoustic output technology, acoustic output devices (e.g., earphones) have been widely used in people's daily life. The acoustic output devices can be used with electronic devices, such as mobile phones, computers, etc., to provide a user with a better auditory service. An acoustic device may generally be classified into a head-mounted type, an ear-hook type, and an in-ear type according to the ways the user wears the acoustic device. The output performance of the acoustic device and the wearing experience have a great impact on the user's comfort.

Therefore, it is desirable to provide an earphone to improve the output performance and the wearing experience of the acoustic output devices.

SUMMARY

One of the embodiments of the present disclosure provides an earphone, comprising: a sound production component, at least a portion of the sound production component extending into a concha cavity; an ear hook, the ear hook being disposed between an auricle and a head of the user, extending toward a side of the auricle away from the head, and connecting the sound production component, and the ear hook being configured to place the sound production component at a position near an ear canal of the user without blocking an opening of the ear canal; wherein, in a non-wearing state, the ear hook and the sound production component form a first projection on a first plane, the first projection comprising an outer contour, a first end contour, an inner contour, and a second end contour, the outer contour of the first projection, the first end contour of the first projection, the second end contour of the first projection, and a tangent segment connecting the first end contour and the second end contour define a first closed curve, and a ratio of a projection area of the sound production component on the first plane to a first area of the first closed curve is between 0.25 and 0.4.

One of the embodiments of the present disclosure further provides an earphone, comprising: a sound production component, at least a portion of the sound production component covering an antihelix region of a user; and an ear hook, the ear hook being disposed between an auricle and a head of the user, extending toward a side of the auricle away from the head, and connecting the sound production component, the ear hook being configured to place the sound production component at a position near an ear canal of the user without blocking an opening of the ear canal; wherein, in a non-wearing state, the ear hook and the sound production component form a fifth projection on a first plane, the fifth projection comprising an outer contour, a first end contour, an inner contour, and a second end contour, the outer contour of the fifth projection, the first end contour of the fifth projection, the second end contour of the fifth projection, and a tangent segment connecting the first end contour and the second end contour define a fifth closed curve; a ratio of a projection area of the sound production component on the first plane to a fifth area of the fifth closed curve is between 0.4 and 0.75.

BRIEF DESCRIPTION OF THE DRAWINGS

The present disclosure is further illustrated by way of exemplary embodiments which are described in detail by way of the accompanying drawings. These embodiments are not limiting, and in these embodiments, the same numbering indicates the same structure where.

DETAILED DESCRIPTION

Figure 1:
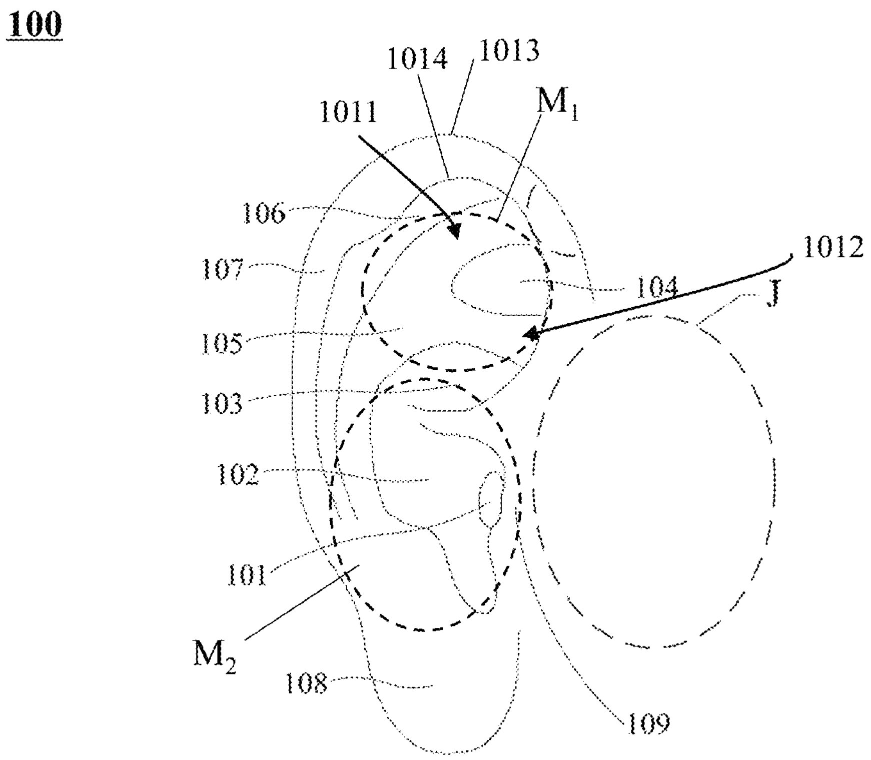
FIG. 1 is a schematic diagram illustrating an exemplary ear according to some embodiments of the present disclosure.

In order to more clearly explain the technical scheme of the embodiment of the present disclosure, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

FIG. 1 is a schematic diagram illustrating an exemplary ear according to some embodiments of the present disclosure. Referring to FIG. 1, an ear 100 may include an external ear canal 101, a concha cavity 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of description, an upper antihelix crus 1011, a lower antihelix crus 1012, and the antihelix 105 are collectively referred to as an antihelix region in some embodiments of the present disclosure. In some embodiments, one or more parts of the ear 100 may be used to support an acoustic device to achieve a stable wearing of the acoustic device. In some embodiments, the external ear canal 101, the concha cavity 102, the cymba conchae 103, the triangular fossa 104, or the like, may have a certain depth or volume in a three-dimensional (3D) space to satisfy a wearing requirement of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved through parts such as the cymba conchae 103, the triangular fossa 104, the anthelix 105, the scapha 106, the helix 107, or the like, or a combination thereof. In some embodiments, the earlobe 108 and other parts of the user's ear may also be used to improve the comfort and reliability of the acoustic device in wearing. By using parts of the ear 100 other than the external ear canal 101 to wear the acoustic device and transmit a sound, the external ear canal 101 of the user's ear may be "liberated". When the user wears the acoustic device (e.g., the earphone), the acoustic device does not block the user's external ear canal 101, and the user receives sound from the acoustic device as well as sound from the environment (e.g., honking, car bells, sounds of people around them, traffic command sound), which may reduce a probability of a traffic accident. In some embodiments, according to a structure of the ear 100, the acoustic device may be designed into a structure adapted to the ear 100, so as to realize a wearing of a sound production component of the acoustic device at different positions of the ear. For example, when the acoustic device is the earphone, the earphone may include a suspension structure (e.g., an ear hook) and the sound production component, the sound production component is physically connected with the suspension structure, and the suspension structure may be adapted to a shape of an auricle to place the whole or a portion of the structure of the sound production component on a front side of the crus of helix 109 (e.g., a region J enclosed by a dashed line in FIG. 1). As another example, the whole or a portion of the structure of the sound production component may be placed in contact to an upper portion of the external ear canal 101 (e.g., the position where one or more of the crus of helix 109, the cymba conchae 103, the triangular fossa 104, the antihelix 105, the scapha 106, the helix 107, and other locations are located). As a further example, when the user wears the earphone, the whole or a portion of the structure of the sound production component may be located in a cavity (e.g., a region M1 containing at least the cymba conchae 103, the triangular fossa 104 and a region M2 containing at least the concha cavity 102 enclosed by the dashed line in FIG. 1) formed by one or more parts of the ear (e.g., the concha cavity 102, the cymba conchae 103, the triangular fossa 104, etc.).

Different users may have individual differences, resulting in different shapes, sizes and other dimensional differences of the ears. For a convenience of illustration and understanding, if not specified, an ear model with a "standard" shape and size may be mainly used in the present disclosure to further describe a wearing manner of the acoustic device on the ear model in different embodiments. For example, a simulator based on ANSI: S3.36, S3.25 and IEC: 60318-7 containing the head and its (left and right) ear, e.g., GRAS 45BC KEMAR, may be used as a reference for wearing an acoustic device, thus presenting a scenario in which most users wear an acoustic device normally. Merely by way of example, an ear used as a reference may have the following relevant characteristics: a projection area of the auricle on a sagittal plane of the user is in a range of 1300 $mm^2$ to 1700 $mm^2$. Thus, in the present disclosure, descriptions such as "worn by the user," "in a worn state," and "in a wearing state" may refer to the acoustic device described in the present disclosure being worn on the ear of the aforementioned simulator. However, taking into account that there are individual differences between different users, a structure, shape, size, thickness, etc. of one or more parts of the ear 100 may be differentiated according to different shapes and sizes of the ear, and such differentiation may be manifested in the fact that feature parameters of the one or more parts of the acoustic device (e.g., the sound production component, the ear hook hereinafter) may have different ranges of values, so as to adapt to different ears.

It should be noted that, in the field of medicine, anatomy, or the like, three base tangent planes of a human body may be defined as a sagittal plane, a coronal plane, and a horizontal plane, and three base axes of the user may be defined as a sagittal axis, a coronal axis, and a vertical axis. The sagittal plane may be a tangent plane perpendicular to the ground along a forward and backward direction of the body, which divides the user into a left portion and a right portion. The coronal plane may be a tangent plane perpendicular to the ground along a left and right direction of the body, which divides the user into a front portion and a rear portion. The horizontal plane may refer to a section parallel to the ground along an up-and-down direction of the body, which divides the user into an upper part and a lower part. Correspondingly, the sagittal axis may be an axis perpendicular to the sagittal plane along a forward and backward direction of the body, the coronal axis may be an axis perpendicular to the sagittal plane along a left and right direction of the body, and the vertical axis may be an axis perpendicular to the horizontal plane along an up and down direction of the body. Furthermore, the "front side" of the ear is a concept relative to a "rear side" of the ear, the front side of the ear refers to a side of the ear along the sagittal axis and is located on a side of the ear facing a facial region of the user, and the rear side of the ear refers to a side of the ear along the sagittal axis and is located on a side of the ear facing away from the facial region of the user. A schematic diagram illustrating a front side contour of an ear shown in FIG. 1 may be obtained by viewing the ear of the simulator mentioned above along the coronal axis of the user.

The description of the ear 100 above is for illustration purposes only and is not intended to limit the scope of the present disclosure. For those skilled in the art, a wide variety of variations and modifications may be made in accordance with the description of the present disclosure. For example, the portion of the structure of the acoustic device may cover a portion or the whole of the external ear canal 101. These changes and modifications remain within the scope of protection of the present disclosure.

Figure 2:
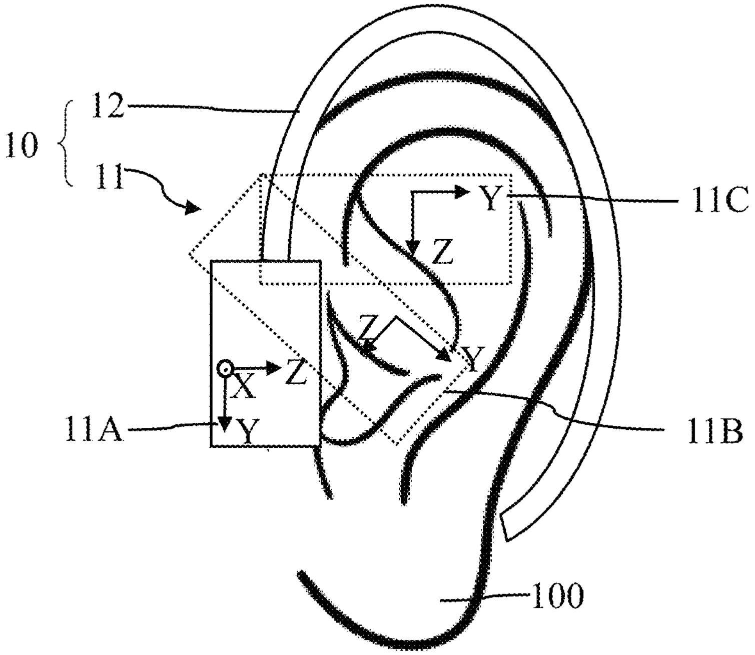
FIG. 2 is a schematic diagram illustrating an exemplary wearing of an earphone according to some embodiments of the present disclosure.

FIG. 2 is a schematic diagram illustrating an exemplary wearing state of an earphone according to some embodiments of the present disclosure. As shown in FIG. 2, an earphone 10 may include a sound production component 11 and a suspension structure 12. In some embodiments, the sound production component 11 of the earphone 10 may be worn on a user's body (e.g., a head, neck, or upper torso of a human body) via the suspension structure 12. In some embodiments, the suspension structure 12 may be an ear hook, the sound production component 11 connects to one end of the ear hook, and the ear hook may have a shape fitting with an ear of the user. For example, the ear hook may be curved. In some embodiments, the suspension structure 12 may also be a clapping structure fitting with an auricle of the user, so that the suspension structure 12 may clap at the auricle of the user. In some embodiments, the suspension structure 12 may include, but is not limited to, the ear hook, an elastic band, or the like, such that the earphone 10 may be better secured to the user to prevent the earphone from dropping during use.

In some embodiments, the sound production component 11 may be worn on the user's body, and a speaker may be provided within the sound production component 11 to produce a sound to input into the user's ear 100. In some embodiments, the earphone 10 may be combined with a product such as eyeglasses, a headset, a head-mounted display device, an AR/VR helmet, etc., in which case the sound production component 11 may be secured to the vicinity of the user's ear 100 in a hanging or clamping manner. In some embodiments, the sound production component 11 may be circular, elliptical, polygonal (regular or irregular), U-shaped, V-shaped, or semi-circular so that the sound production component 11 may be hung directly at the user's ear 100.

In conjunction with FIGS. 1 and 2, in some embodiments, when the user wears the earphone 10, at least a portion of the sound production component 11 may be disposed above, below, anterior to (e.g., a region J on a front side of a tragus illustrated in FIG. 1), or in the auricle (for example, regions M1 or M2 illustrated in FIG. 1) of, the user's ear 100. The following may be illustrated exemplarily in conjunction with different wearing positions (11A, 11B, and 11C) of the sound production component 11. In some embodiments, a sound production component 11A is placed on a side of the user's ear 100 facing a facial region of the user along a sagittal axis, i.e., the sound production component 11A is placed in a facial region on the front side of the ear 100 (e.g., the region J illustrated in FIG. 1). Further, a speaker is provided inside a casing of the sound production component 11A, at least one sound outlet hole (not shown in FIG. 2) may be provided on the casing of the sound production component 11A, the sound outlet hole may be located on a sidewall of the casing facing or near the external ear canal of the user, and the speaker may output a sound to the user at the user's ear canal through the sound outlet hole. In some embodiments, the speaker may include a diaphragm, a cavity inside the casing may be separated by the diaphragm into at least a front cavity and a rear cavity, the sound outlet hole may be acoustically coupled to the front cavity, the vibration of the diaphragm driving the air in the front cavity to vibrate to generate an air-conducted sound, and the air-conducted sound generated in the front cavity may be transmitted to the outside world through the sound outlet hole. In some embodiments, one or more pressure relief holes may be disposed on the casing, at least one of the one or more pressure relief holes may be located on a sidewall adjacent or opposite to a sidewall where the sound outlet hole is located on the casing, the one or more pressure relief holes are acoustically coupled to the rear cavity, the vibration of the diaphragm also drives the air in the rear cavity to vibrate to produce the air-conducted sound, and the air-conducted sound generated in the rear cavity may be transmitted to the outside world through the one or more pressure relief holes. Exemplarily, in some embodiments, the speaker within the sound production component 11A may output sounds with a phase difference (e.g., opposite phase) through the sound outlet hole and the pressure relief hole, respectively, the sound outlet hole may be disposed on a sidewall of the casing of the sound production component 11A sidewall facing the user's external ear canal 101, and the one or more pressure relief holes may be located on a side of the casing of the sound production component 11 away from the user's external ear canal 101. In such cases, the casing may function as a baffle to increase a sound path difference respectively from the sound outlet hole and the one or more pressure relief hole to the external ear canal 101, thereby increasing an intensity of a sound at the external ear canal 101 while decreasing a volume of sound leakage in a far-field. In some embodiments, the sound production component 11 may have a long-axis direction Y and a short-axis direction Z that are perpendicular to a thickness direction X and orthogonal to each other. The long-axis direction Y may be defined as a direction having a largest extension dimension in shapes of two-dimensional projections (e.g., a projection of the sound production component 11 on a plane in which an outer side surface of the sound production component 11 is located, or on the sagittal plane of the user) of the sound production component 11 (e.g., when a projection is a rectangle or a proximate-rectangle, the long-axis direction is a length direction of the rectangle or proximate rectangle), and the short-axis direction Z may be defined as a direction perpendicular to the long-axis direction Y in the projection shape of the sound production component 11 on the sagittal plane of the user (e.g., when the projection shape is a rectangle or proximate-rectangle, the short-axis direction is a width direction of the rectangle or proximate-rectangle). The thickness direction X may be defined as a direction perpendicular to the two-dimensional projection, e.g., the thickness direction X is the same as the direction of the coronal axis, and both the thickness direction X and the coronal axis point to the left and right of the body. In some embodiments, when the sound production component 11 is in an inclined state in a wearing state, the long-axis direction Y and the short-axis direction Z are still parallel or approximately parallel to the sagittal plane, and the long-axis direction Y may have a certain angle with a direction of the sagittal axis, i.e., the long-axis direction Y may be inclined accordingly, and the short-axis direction Z may have a certain angle with a direction of the vertical axis, i.e., the short-axis direction Z may be inclined, such as a sound production component 11B in the wearing state as shown in FIG. 2. In some embodiments, a whole or a portion of the structure of the casing of the sound production component 11B may extend into the concha cavity, i.e., a projection of the casing of the sound production component 11B on the sagittal plane and a projection of the concha cavity on the sagittal plane of the user has an overlapping region. More description regarding the sound production component 11B may be found elsewhere in the present disclosure, e.g., in FIG. 3 and its corresponding description. In some embodiments, the sound production component in the wearing state may also be in a horizontal state or an approximately horizontal state, as a sound production component 11C shown in FIG. 2, where the long-axis direction Y may be in the same direction or the approximate-same direction as the direction of the sagittal axis, both pointing at a front-and-back direction of the body, and the short-axis direction Z may be consistent or approximately consistent with the direction of the vertical axis, both pointing at an up-and-down direction of the body. It should be noted that in the wearing state, the sound production component 11C being in the approximate-horizontal state refers to that an angle between a long-axis direction and a sagittal axis of the sound production component 11C shown in FIG. 2 is in a specific range (e.g., not greater than 20°). In addition, a wearing position of the sound production component 11 is not limited to the sound production component 11A, the sound production component 11B, and the sound production component 11C illustrated in FIG. 2. Any position within the region J, the region M1, or the region M2 illustrated in FIG. 1 may be the wearing position of the sound production component 11. For example, a whole or a portion of the structure of the sound production component 11 may be located on a front side of the crus of helix 109 (e.g., the region J surrounded by a dashed line in FIG. 1). As another example, the whole or part of the structure of the sound production component may be disposed in contact with an upper part of the external ear canal 101 (e.g., a position where one or more of the crus of helix 109, the cymba conchae 103, the triangular fossa 104, the antihelix 105, the scapha 106, the helix 107, etc. are located). As a further example, the whole or a portion of the structure of the sound production component of an acoustic device may be disposed within a cavity (e.g., the region M1 containing at least the cymba conchae 103 and the triangular fossa 104 and the region M2 containing at least the concha cavity 102, enclosed by the dashed line in FIG. 1) formed by one or more parts of the ear (e.g., the concha cavity 102, the cymba conchae 103, the triangular fossa 104, etc.).

In order to improve the stability of the earphone 10 in the wearing state, the earphone 10 may be used in any one of the following ways or a combination thereof. Firstly, at least part of the suspension structure 12 is provided with a profiling structure that fits to at least one of a rear side of the ear or a head to increase a contact area of the suspension structure 12 with the ear and/or the head, thereby increasing a resistance preventing the earphone 10 from falling from the ear. Secondly, at least a part of the suspension structure 12 is provided as an elastic structure to have a certain amount of deformity in the wearing state to increase a positive pressure of the suspension structure 12 on the ear and/or the head, thereby increasing the resistance preventing the earphone 10 from falling from the ear. Thirdly, the suspension structure 12 is at least partially provided to abut against the ear and/or the head in the wearing state, so as to form a reaction force that presses on the ear, so as to cause the sound production component 11 to be pressed on a side of the ear that is away from the head along the coronal axis, thereby increasing the resistance preventing the earphone 10 from falling from the ear. Fourthly, the sound production component 11 and the suspension structure 12 are provided to clamp an antihelix region, a region where the concha cavity is located, or the like, from the front and rear sides of the ear in the wearing state, so as to increase the resistance preventing the earphone 10 from falling from the ear. Fifthly, the sound production component 11 or a structure connected thereto is set to extend at least partially into a cavity such as the concha cavity 102, the cymba conchae 103, the triangular fossa 104 and the scapha 106, etc., so as to increase the resistance preventing the earphone 10 from falling from the ear.

Figure 3:
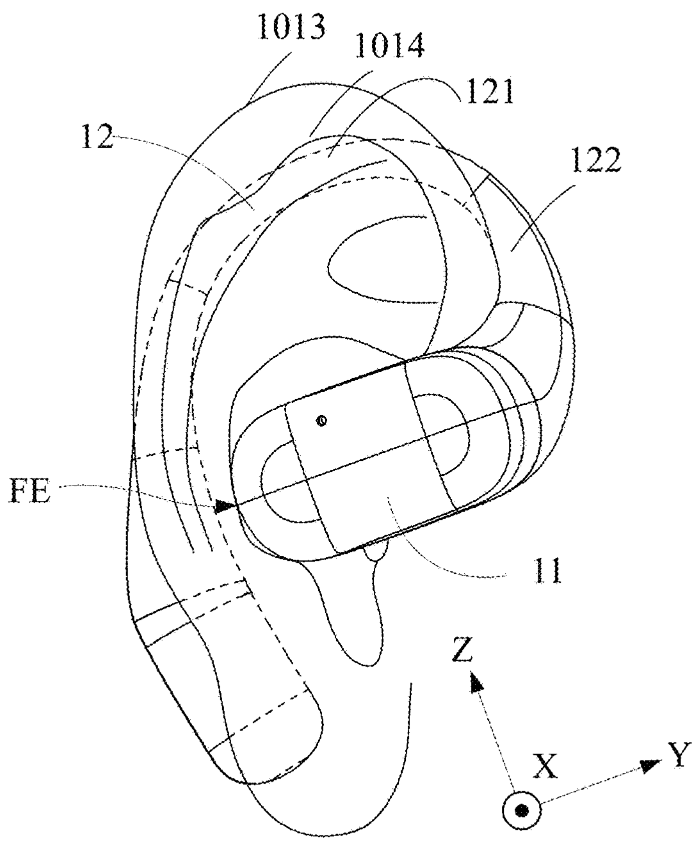
FIG. 3 is a schematic diagram illustrating an exemplary wearing of the earphone according to some embodiments of the present disclosure.

Exemplarily, in conjunction with FIG. 3, an end FE (also referred to as a free end) of the sound production component 11 may extend into the concha cavity in the wearing state. Optionally, the sound production component 11 and the suspension structure 12 may be provided to clamp the ear region corresponding to the concha cavity from the front and rear sides of the ear region, thereby increasing the resistance preventing the earphone 10 from falling from the ear, and thereby improving the stability of the earphone 10 in the wearing state. For example, the end FE of the sound production component is pressed and held in the concha cavity along the thickness direction X. As another example, the end FE abuts against the concha cavity along the long-axis direction Y and/or the short-axis direction Z (e.g., against an inner wall of the concha cavity facing the end FE). It should be noted that the end FE of the sound production component 11 refers to an end disposed opposite to a fixed end connecting the sound production component 11 and the suspension structure 12 and is also referred to as the free end. The sound production component 11 may be a regular or irregularly shaped structure, and is illustrated here exemplarily to further illustrate the end FE of the sound production component 11. For example, when the sound production component 11 is a rectangular structure, an end wall of the sound production component 11 is a plane, and the end FE of the sound production component 11 is an end sidewall of the sound production component 11 opposite to the fixed end connecting the sound production component 11 and the suspension structure 12. As another example, if the sound production component 11 is a sphere, an ellipsoid, or an irregular structure, the end FE of the sound production component 11 may refer to a specific region away from the fixed end obtained by cutting the sound production component 11 along a Y-Z plane (a plane formed by the short-axis direction Z and the thickness direction X), and a ratio of a size of the specific region along the long-axis direction Y to a size of the sound production component along the long-axis direction Y may be in a range of 0.05 to 0.2.

Figure 4:
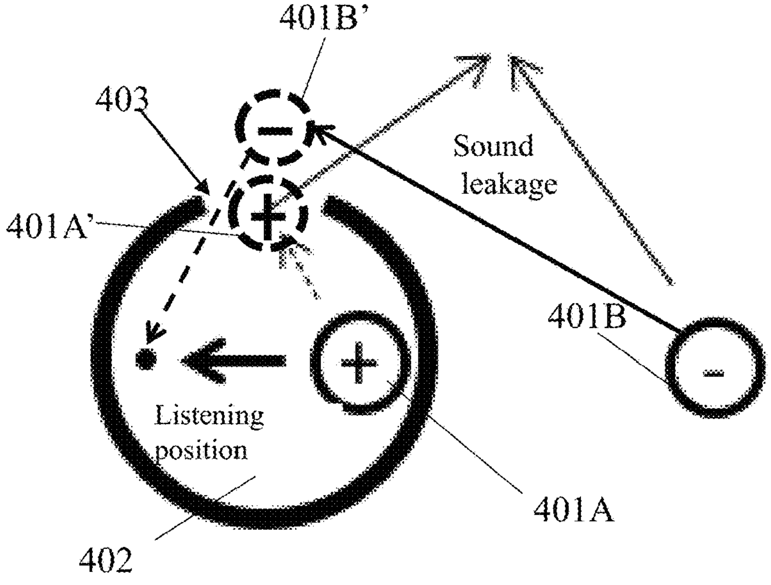
FIG. 4 is a schematic diagram illustrating an acoustic model formed by the earphone according to some embodiments of the present disclosure.

A sound volume at a listening position (e.g., at an auricle), especially a sound volume at middle and low frequencies, may be improved by at least partially extending the sound production component 11 into the concha cavity, and a good effect of far-field leakage cancellation may be obtained. For illustration purposes only, when the whole or a portion of the structure of the sound production component 11 extends into the concha cavity 102, the sound production component 11 forms a structure similar to a cavity (hereinafter referred to as a cavity-like structure) with the concha cavity 102. In embodiments of the present disclosure, the cavity-like structure may be understood as a semi-enclosed structure enclosed by sidewalls of the sound production component 11 together with a structure of the concha cavity 102. Through the semi-enclosed structure, an interior environment is not completely hermetically sealed off from an external environment, instead, there is a leakage structure (e.g., an opening, a slit, a pipe) in an acoustic communication with the external environment. When the user wears the earphone 10, one or more sound outlet holes may be provided on a side of the casing of the sound production component 11 proximate to or facing the user's ear canal, one or more pressure relief holes may be provided on other sidewalls (e.g., sidewalls away from or back from the user's ear canal) of the casing of the sound production component 11, the one or more sound outlet holes may be acoustically coupled to the front cavity of the earphone 10, and the one or more pressure relief holes may be acoustically coupled to the rear cavity of the earphone 10. Taking the sound production component 11 including one sound outlet hole and one pressure relief hole as an example, a sound output from the sound outlet hole and a sound output from the pressure relief hole may be approximated as two sound sources, and the two sound sources are equal in amplitude and opposite in phase. The sound production component 11 and a corresponding inner wall of the concha cavity form the cavity-like structure, wherein a sound source corresponding to the sound outlet hole is located inside the cavity-like structure and a sound source corresponding to the pressure relief hole is located outside the cavity-like structure, thereby forming an acoustic model shown in FIG. 4. As shown in FIG. 4, a cavity-like structure 402 may include a listening position and at least one sound source 401A. The "include" here may indicate that at least one of the listening position and the sound source 401A are inside the cavity-like structure 402, or refer to that at least one of the listening position and the sound source 401A are at an inner edge of the cavity-like structure 402. The listening position may be equivalent to an opening of the ear canal, or an acoustic reference point of the ear such as an ear reference point (ERP), an ear-drum reference point (DRP), or an entrance structure oriented to the listener, etc. The sound source 401B is located outside the cavity-like structure 402, the sound sources 401A and 401B with opposite phases radiate sounds to a surrounding space respectively, and the sounds interfere and cancel each other to reduce or eliminate the sound leakage. Specifically, as the sound source 401A is surrounded by the cavity-like structure 402, most of the sound output from the sound source 401A reaches the listening position by a direct emission or a reflection. In contrast, without the cavity-like structure 402, most of the sound radiated from the sound source 401A may not reach the listening position. Therefore, the cavity structure may significantly increase the volume of the sound reaching the listening position. Furthermore, only a small part of an opposite phase sound output from the sound source 401B outside the cavity-like structure 402 enters the cavity-like structure 402 through a leakage structure 403 of the cavity-like structure 402. This is equivalent to generating a secondary sound source 401B' at the leakage structure 403, and an intensity of the secondary sound source 401B' is significantly lower than that of the sound source 401B and the sound source 401A. A sound generated by the secondary sound source 401B' has a weak canceling effect on the sound source 401A within the cavity, resulting in a significant increase in a listening volume at the listening position. For a sound leakage, the sound source 401A radiating sound to the outside world through the leakage structure 403 of the cavity is equivalent to generating a secondary sound source 401A' at the leakage structure 403. Since almost all of the sound radiated by the sound source 401A is output from the leakage structure 403, and a scale of the cavity-like structure 402 is much smaller than a spatial scale for evaluating the sound leakage (a difference between the size of the cavity-like structure 402 and the spatial size is at least one order of magnitude), an intensity of the secondary sound source 401A' may be considered equivalent to an intensity of the sound source 401A, and a considerable sound leakage reduction effect is still maintained.

In a specific application scenario, an outer wall surface of the casing of the sound production component 11 is usually a plane or a curved surface, and a contour of the user's concha cavity is an uneven structure. When a portion or an entire structure of the sound production component 11 extends into the concha cavity, the cavity-like structure communicating with the outside world is formed by the sound production component 11 and the contour of the concha cavity. Furthermore, the acoustic model shown in FIG. 4 may be constructed by setting the sound outlet hole at a position of the casing of the sound production component facing the opening of the user's ear canal and close to the edge of the concha cavity, and by setting the pressure relief hole at a position of the sound production component 11 facing away from or away from the opening of the ear canal, which may improve the user's listening volume at the opening of the ear canal when the user wears the earphone and reduce the far-field sound leakage.

In some embodiments, the sound production component of the earphone may include a transducer and the casing accommodating the transducer, wherein the transducer is an element that may receive an electrical signal and convert the electrical signal into a sound signal for output. In some embodiments, differentiated by frequency, a type of the transducer may include a low-frequency (e.g., 30 Hz-150 Hz) transducer, a low-mid frequency (e.g., 150 Hz-500 Hz) transducer, a mid-high frequency (e.g., 500 Hz-5 kHz) transducer, a high-frequency (e.g., 5 kHz-16 kHz) transducer, or a full-frequency (e.g., 30 Hz-16 kHz) transducer, or any combination thereof. The low-frequency, the high-frequency, etc., mentioned here only indicate an approximate range of a frequency, and in different application scenarios, there may be different division modes. For example, a frequency division point may be determined. The low-frequency may refer to a frequency range below the frequency division point, and the high-frequency may refer to a frequency above the frequency division point. The frequency division point may be any value in an audible range of the ear, for example, 500 Hz, 600 Hz, 700 Hz, 800 Hz, 1000 Hz, or the like.

In some embodiments, the transducer may include the diaphragm. When the diaphragm vibrates, a sound may be transmitted from the front and rear sides of the diaphragm, respectively. In some embodiments, the front cavity (not shown) is disposed at the front side of the diaphragm within the casing 120. The front cavity is acoustically coupled to the sound outlet hole, and the sound from the front side of the diaphragm may be transmitted outside from the sound outlet hole through the front cavity. The rear cavity for transmitting a sound is provided on the rear side of the diaphragm within the casing 120 (not shown). The rear cavity may be acoustically coupled to the pressure relief hole, and the sound of the rear side of the diaphragm may be transmitted outside from the sound hole through the front cavity.

Referring to FIG. 3, an ear hook is illustrated herein as an example of the suspension structure 12, and in some embodiments, the ear hook may include a first portion 121 and a second portion 122 connected in sequence, wherein the first portion 121 may be disposed between the user's ear and head, and the second portion 122 may extend toward an outside of the ear (a side of the ear away from the head along the coronal axis) and connect the sound production component to place the sound production component between the auricle and the head without blocking the opening of the ear canal. In some embodiments, the sound outlet hole may be disposed on a sidewall of the casing facing the auricle to transmit a sound generated by the transducer out of the casing and toward the opening of the user's ear canal.

In some embodiments, the ear hook may be flexible, and a relative position between the sound production component 11 and the ear hook may differ in the wearing state and the non-wearing state. For example, to facilitate wearing and to ensure the wearing stability, a distance from the end FE of the sound production component 11 to the ear hook in the non-wearing state is smaller than a distance from the end FE of the sound production component 11 to the ear hook in the wearing state, so that the sound production component 11 tends to move closer to the ear hook in the wearing state and generate a clamping force on the ear. For the wearing state and the non-wearing state of the earphone 10, explanations may be provided in the following.

To facilitate understanding and describing the earphone 10 in the non-wearing state or the wearing state, the earphone 10 may be projected on a specific plane, and the earphone 10 may be described based on parameters related to a projection shape of earphone 10 on that plane. For example, in the wearing state, the earphone 10 may be projected on the sagittal plane of the user to form a corresponding projection shape. In the non-wearing state, a similar first plane may be selected with reference to a relative position of the sagittal plane of the user with respect to the earphone 10, so that a projection shape of the earphone 10 on the first plane is similar to a projection shape of the earphone 10 on the sagittal plane of the user. For ease of description, referring to FIG. 6, in some embodiments, the first plane may be determined based on a shape of the ear hook when the user does not wear the earphone 10. For example, the first plane may be determined by placing the ear hook on a flat support plane (e.g., a horizontal tabletop, a ground plane), and when the ear hook is in contact with the support plane and is placed in a stable state, the support plane is the first plane corresponding to the earphone 10. Of course, to maintain a unity of a specific plane corresponding to the wearing state and the non-wearing state, the first plane may also be the sagittal plane of the user, where the non-wearing state may be manifested as removing an auricle in the user's head model and using a fixation member or glue to fix the sound production component 11 to the head model in the same posture as in the wearing state. In some embodiments, the first plane may also refer to a plane formed by a bisector that bisects or substantially bisects the ear hook along a longitudinal extension direction of the ear hook.

Figure 5:
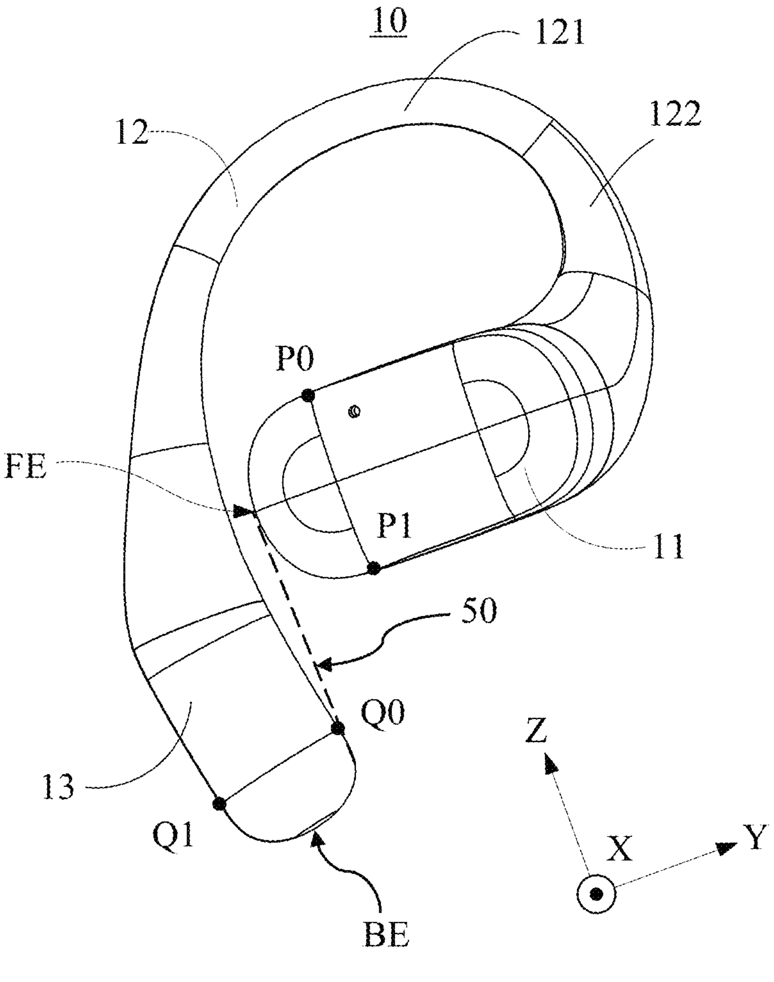
FIG. 5 is a schematic diagram illustrating a structure of an earphone in a non-wearing state according to some embodiments of the present disclosure.
Figure 6:
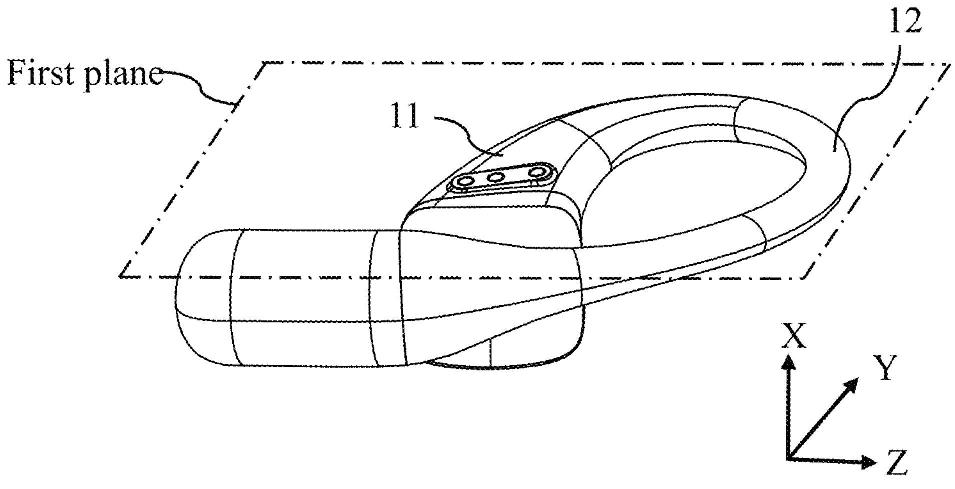
FIG. 6 is a diagram illustrating a first projection of an earphone in a non-wearing state on a first plane according to some embodiments of the present disclosure.

FIG. 5 is a schematic diagram illustrating a structure of an earphone in a non-wearing state according to some embodiments of the present disclosure; and FIG. 6 is diagram illustrating a first projection of an earphone in a non-wearing state on a first plane according to some embodiments of the present disclosure.

In conjunction with FIGS. 5 and 6, in some embodiments, the first projection includes an outer contour, a first end contour, an inner contour, and a second end contour. The first end contour may be a projection contour of an end FE of the sound production component 11 on the first plane, and two end points P0 and P1 of the first end contour may be projection points of an intersection between the end FE and other portions of the sound production component 11 on the first plane. A determination of the end FE may be found in the relevant description in FIG. 3 of the present disclosure. The second end contour may be a projection contour of a free end BE of the suspension structure 12 on the first plane, and two end points Q0 and Q1 of the second end contour may be projection points of an intersection between the free end BE and other portions of the suspension structure 12 on the first plane. The outer contour may be a contour of the first projection between the point P1 and the point Q1. The inner contour may be a contour of the first projection between the point P0 and the point Q0.

It should be noted that the free end BE of the suspension structure 12 may be at least a portion of an end of a first portion of the suspension structure 12 away from a second portion. The end of the first portion of the suspension structure 12 away from the second portion may be a regular or irregularly shaped structure, which is illustrated here exemplarily to further illustrate the free end BE of the suspension structure 12. For example, if the end of the first portion of the suspension structure 12 away from the second portion is a rectangular structure, an end wall of the end is a plane, in which case the free end BE of the suspension structure 12 is an end sidewall of the end of the first portion of the suspension structure 12 away from the second portion. As another example, when the end of the first portion of the suspension structure 12 away from the second portion is a sphere, an ellipsoid, or an irregular structure, the free end BE of the suspension structure 12 may be a region obtained by extending a specific distance from a farthest position away from the second portion to the second portion along an extension direction of the first portion of the suspension structure 12, and a ratio of the specific distance to a total extension distance of the first portion of the suspension structure 12 may be in a range of 0.05-0.2.

Taking a projection of the sound production component 11 on the first plane being a rectangle-like shape (e.g., a runway shape) as an example, in the projection of the sound production component 11, there are parallel or approximately parallel projections of upper sidewall and lower sidewall, and a first end contour connecting a projection of the upper sidewall and a projection of the lower sidewall, the first end contour may be a straight line segment or a circular arc, and the points P0 and P1 denote two ends of the first end contour. Merely by way of example, the point P0 may be a junction point between an arc formed by a projection of the end FE and a line segment of the projection of the upper sidewall, and similarly, the point P1 may be a junction point between an arc formed by the projection of the end FE and a line segment of the projection of the lower sidewall. Similarly, an end of the ear hook away from the sound production component 11 also has a free end, a projection of the free end of the ear hook on the first plane forms the second end contour, the second end contour may be a straight line segment or an arc, and the points Q0 and Q1 represent two ends of the second end contour. In some embodiments, the points Q0 and Q1 may be two end points of a line segment or arc of a projection of the free end of the first portion 121 of the ear hook away from the second portion 122 of the ear hook on the first plane. Furthermore, along a long-axis direction Y of the sound production component 11, an end point near the sound production component 11 is the point Q0, and an end point away from the sound production component 11 is the point Q1.

A projection shape of the earphone 10 on the first plane and a sagittal plane of a user may reflect how the earphone 10 is worn at an ear. For example, an area of the first projection may reflect an area of an auricle of the ear that may be covered by the earphone 10 in the wearing state and how the sound production component 11 and the ear hook contact the ear. In some embodiments, the inner contour, the outer contour, the first end contour, and the second end contour of the first projection form a non-enclosed region, since the sound production component 11 is not in contact with the first portion 121 of the ear hook. A size of this region is closely related to the wearing effect of the earphone 10 (e.g., stability of wearing, a position of sound production, etc.). For ease of understanding, in some embodiments, a tangent segment 50 connecting the first end contour and the second end contour may be determined, and an area enclosed by a first closed curve jointly defined by the tangent segment 50, the outer contour, the first end contour, and the second end contour is taken as the area of the first projection (also referred to as a "first area").

A whole or a portion of the sound production component 11 may extend into a concha cavity to improve the sound production efficiency of the sound production component 11, where the sound production efficiency may be understood as a ratio of a listening volume at an opening of an ear canal to a far-field sound leakage volume. For the sound production component 11B at the position with respect to the ear as shown in FIG. 2, a size of the sound production component 11 may be relatively small to fit a size of the concha cavity. Additionally, to make the first portion 121 of the ear hook and the sound production component 11 provide a suitable clamping force at an edge of the concha cavity, so that the earphone 10 can be worn more stably, in the non-wearing state, a distance from the sound production component 11 to the first portion 121 of the ear hook should not be too small. In such cases, by providing a suitable clamping force, the earphone 10 may be not merely supported by an upper edge of the ear only in the wearing state, which may improve the wearing comfort. Considering the above factors, the first area enclosed by the first closed curve may be set relatively small in the non-wearing state. In some embodiments, the first area enclosed by the first closed curve is not greater than 1500 $mm^2$.

In some embodiments, since at least a portion of the ear hook abuts against the ear and/or the head in the wearing state to form a force that presses against the ear, a too small first area may bring a foreign body sensation to some people (e.g., people with a large auricle) when wearing the earphone 10. Therefore, taking into account a wearing manner and a size of the ear, the first area of the first closed curve may be not less than 1000 $mm^2$; at the same time, in some embodiments, taking into account that a relative position of the sound production component 11 and the user's ear canal (e.g., the concha cavity) affects a count of leakage structures and a size of an opening of the leakage structure in the cavity-like structure formed by the sound production component 11 and the user's concha cavity, and the size of the opening of the leakage structure directly affects the listening volume, specifically, when the first area is too small, the sound production component 11 may not be able to abut the edge of the concha cavity, resulting in an increase in sound components directly radiated outwards by the sound production component 11 and a decrease in sound reaching the listening position, which results in a decrease in the sound production efficiency of the sound production component 11, in some embodiments, the first area of the first closed curve may be in a range of 1000 $mm^2$-1500 $mm^2$.

In some embodiments, considering an overall structure of the earphone 10, a shape of the ear hook that needs to adapt to a space between the ear and the head, or the like, the first area of the first closed curve may be not less than 1150 $mm^2$. In some embodiments, a range of the first area of the first closed curve may be not greater than 1350 $mm^2$ to ensure the sound production efficiency of the sound production component 11 as well as a moderate clamping force. Therefore, in some embodiments, the first area of the first closed curve may be in a range of 1150 $mm^2$-1350 $mm^2$ to ensure the sound production efficiency of the sound production component 11 as well as the user's comfort in wearing the earphone 10, and at the same time, an appropriate first area may improve the listening volume of the earphone 10 at the listening position (e.g., at the opening of the ear canal), especially a listening volume at the low-and-middle frequency, while maintaining a better cancellation effect of a far-field sound leakage.

To make the whole or a portion of the sound production component 11 extend into the concha cavity, e.g., the sound production component 11B at a position relative to the ear shown in FIG. 2, and form an acoustic model with the user's concha cavity shown in FIG. 4, a relative size between a projection area of the sound production component 11 on the first plane and the first area may be configured. In some embodiments, a ratio of the projection area of the sound production component 11 on the first plane to the first area may be relatively small when the earphone 10 is in the non-wearing state such that the earphone 10 may not block the opening of the user's ear canal when the user wears the earphone 10 and a load of the user may be reduced, which may facilitate the user to obtain an environmental sound or daily communication when the user wears the earphone 10. For example, the projection area of the sound production component 11 on the first plane may be not greater than a half of the first area (i.e., the ratio is not greater than 0.5). In some embodiments, the ratio of the projection area of the sound production component 11 on the first plane to the first area may be in a range of 0.22-0.43. Further, the ratio of the projection area of the sound production component 11 on the first plane to the first area may be in a range of 0.25-0.4, thereby alleviating the wearing sensation of the user.

Because a size and contour shape of the concha cavity may vary from user to user (e.g., by age, gender, height, and weight), an overall size of the sound production component 11 (in particular, a size along a long-axis and a size along a short-axis) may not be too large or too small. For example, if the projection area of the sound production component 11 is too small, the sound production component 11 is not able to cover the concha cavity adequately, and a size of a gap formed between the sound production component 11 and the concha cavity is large, which may result in a relatively low listening volume at the opening of the user's ear canal. When the projection area of the sound production component 11 is too large, the sound production component 11 may cover the opening of the user's ear canal, so that the opening of the ear canal may not be kept open, which may affect the user's access to a sound in the external environment. To ensure a listening effect when the user wears the earphone 10 and at the same time maintains the opening of the ear canal in an open state to obtain the sound in the external environment, in some embodiments, the projection area of the sound production component 11 may be in a range of 202 $mm^2$-560 $mm^2$. On this basis, to ensure that the sound production component 11 has a high sound production efficiency and that the force of the ear hook pressing on the ear is moderate in the wearing state, the first area may be in a range of 1000 $mm^2$-1500 $mm^2$. Further, to make the sound production component 11 produce a better listening effect, the first area may be in a range of 1150 $mm^2$-1350 $mm^2$, the projection area of the sound production component 11 may be in a range of 330 $mm^2$-440 $mm^2$, and the ratio of the projection area of the sound production component 11 on the first plane to the first area is in a range of 0.25-0.4.

Referring to FIG. 5, in some embodiments, the inner contour, the first end contour, the second end contour, and the tangent segment 50 connecting the first end contour and the second end contour define a third closed curve when the earphone 10 is in the non-wearing state. For ease of understanding, similar to the first area, in some embodiments, an area enclosed by the third closed curve may be taken as an area of a third projection (also referred to as a "third area"). The third closed curve may reflect how well the sound production component 11 and the ear hook fit the ear when the earphone 10 is in the wearing state.

The relative position between the sound production component 11 and the user's ear canal (e.g., the concha cavity) affects the count of leakage structures in the cavity-like structure formed by the sound production component 11 and the user's concha cavity and the size of the opening of the leakage structure, and the size of the opening of the leakage structure directly affects the listening quality. Specifically, when the third area is too large, the sound production component 11 may not be able to abut the edge of the concha cavity, resulting in an increase in sound components directly radiated outwards by the sound production component 11 and a decrease in sound reaching the listening position, which in turn results in a decrease in the sound production efficiency of the sound production component 11. In some embodiments, taking into account the overall structure of the earphone 10, a shape of the ear hook that needs to adapt to the space between the ear and the head, etc., the third area may not be too large. In such cases, a ratio of the projection area of the sound production component 11 on the first plane to the third area of the third closed curve may be not less than 0.6. If the third area is too small, an excessive clamping force may be applied by the ear hook and the sound production component 11 to the user's ear. Therefore, in some embodiments, the ratio of the projection area of the sound production component 11 on the first plane to the third area of the third closed curve may be not greater than 1.12. In some embodiments, the ratio of the projection area of the sound production component 11 on the first plane to the third area of the third closed curve may be in a range of 0.6-1.12. Furthermore, an excessively large third area may lead to a reduction in clamping effect of the ear hook and the sound production component 11. In such cases, a self-weight of the earphone 10 is supported by the upper edge of the user's ear, leading to an increase in an increased foreign body sensation. In such cases, to ensure the user's wearing comfort and prevent an excessively small third area from affecting the extension of the sound production component 11 into the concha cavity, the ratio of the projection area of the sound production component 11 on the first plane to the third area is in a range of 0.67-1.06.

In some embodiments, based on the range of the ratio of the projection area of the sound production component 11 on the first plane to the third area of the third closed curve, the third area may be in a range of 200 $mm^2$-600 $mm^2$. Further, to ensure the listening volume of the earphone 10 at the listening position (e.g., at the opening of the ear canal) and to improve the comfort of the user when wearing the earphone 10, the third area is in a range of 300 $mm^2$-500 $mm^2$.

In some embodiments, a difference between the first area and the third area is equal to the projection area of the earphone 10 on the first plane (i.e., a sum of the projection area of the sound production component 11 on the first plane and a projection area of the ear hook on the first plane). To enable a user to obtain a higher listening volume at the listening position, a size of the transducer may be increased or an input power (or an input voltage) from a battery to the transducer may be increased. However, an increase in the size of the transducer may increase the size of the sound production component 11, and an increase in the input power from the battery to the transducer without affecting a battery life of the earphone 10 may increase a size of a battery compartment. In some embodiments, since the sound production efficiency of the sound production component 11 may be increased in a wearing manner in which at least a portion of the sound production component 11 extends into the concha cavity, the sound production component 11 may have a relatively small volume (i.e., the earphone 10 having a relatively small volume) to ensure that the sound production component 11 may provide a higher listening volume at the listening position. Correspondingly, a ratio of the projection area of the sound production component 11 on the first plane to the projection area of the earphone 10 on the first plane is not greater than 0.65. In some embodiments, to prevent the size of the gap formed between the sound production component 11 and the concha cavity from being too large, which results in a decrease in the listening volume at the opening of the user's ear canal, the size of the sound production component 11 should not be too small. In such cases, the ratio of the projection area of the sound production component 11 on the first plane to the projection area of the earphone 10 on the first plane is not less than 0.28. To ensure that the sound production component can provide sufficient listening volume in the wearing state, correspondingly, in the non-wearing state, the ratio of the projection area of the sound production component 11 on the first plane to the projection area of the earphone 10 on the first plane is in a range of 0.28-0.65. Further, to improve the listening effect when the user wears the earphone 10, the ratio of the projection area of the sound production component 11 on the first plane to the projection area of the earphone 10 on the first plane is in a range of 0.35-0.59.

As described above, the difference between the first area and the third area is equal to the projection area of the earphone 10 on the first plane, in some embodiments, in the non-wearing state, the ratio of the projection area of the sound production component 11 on the first plane to the projection area of the earphone 10 on the first plane is in a range of 0.28 to 0.65, and the projection area of the earphone 10 on the first plane is in a range of 500 $mm^2$-1180 $mm^2$. Furthermore, in a wearing mode in which the sound production component 11 extends into the concha cavity, to control the size of the sound production component 11 to be in an appropriate range to improve the wearing comfort of the earphone 10, the ratio of the projection area of the sound production component 11 on the first plane to the projection area of the earphone 10 is in a range of 0.35-0.59, and the projection area of the earphone 10 on the first plane is in a range of 650 $mm^2$-970 $mm^2$.

Figure 8:
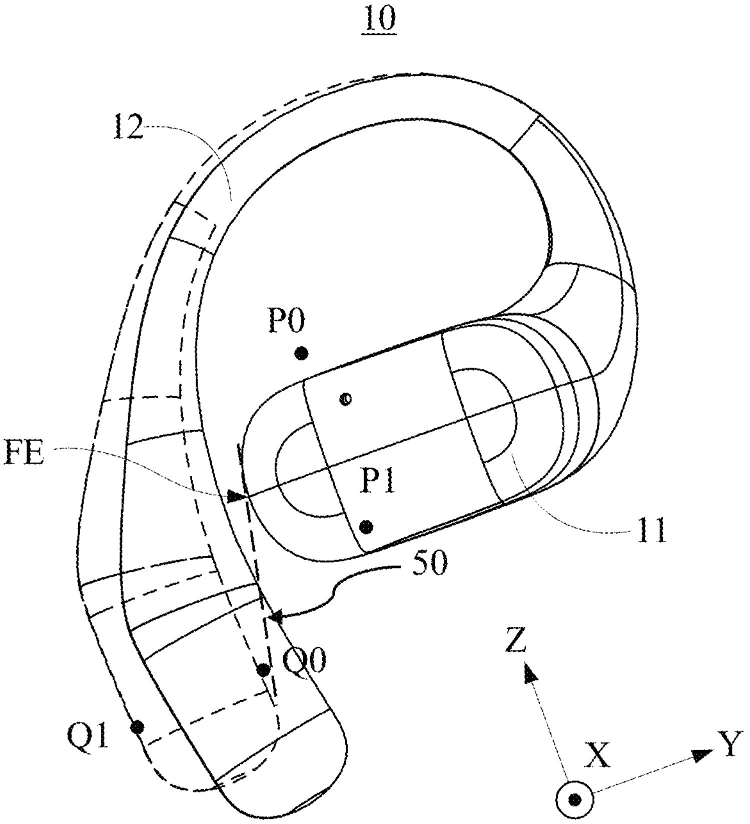
FIG. 8 is a schematic diagram illustrating an earphone in a wearing state and an earphone in a non-wearing state according to some embodiments of the present disclosure.

FIG. 8 is a schematic diagram illustrating the earphone 10 in a wearing state and a non-wearing state according to some embodiments of the present disclosure. A dashed region indicates a first portion of the ear hook in the wearing state, which is farther away from an end FE of the sound production component 11 compared to the first portion of the ear hook in the non-wearing state. In the wearing state, the ear hook and the sound production component 11 form a second projection on a sagittal plane of a user, and similar to the first projection shown in FIG. 5, the second projection also comprises an outer contour, a first end contour, an inner contour, and a second end contour, and the outer contour, the first end contour, the second end contour, and a tangent segment connecting the first end contour and the second end contour define a second closed curve. As described above, a projection shape formed by the earphone 10 on a first plane is close to a projection shape formed by the earphone 10 on the sagittal plane of the user, and therefore. In such cases, edge points of a contour illustrated in FIG. 5, i.e., the point P0, the point P1, the point Q0, and the point Q1, may still be used to describe a division of contours in the second projection. That is, the outer contour, the first end contour, the inner contour, and the second end contour, as well as the tangent segment in the second projection are defined similarly to those of the first projection, which will not be repeated here. An area enclosed by the second closed curve is considered to be an area of the second projection (also referred to as a "second area"). In some embodiments, the second area may reflect a fit of the earphone 10 to the user's ear in the wearing state.

In some embodiments, the second area of the second closed curve may be obtained by simulating a shape of the earphone 10 in the wearing state. Exemplarily, a relative position of portions of the earphone 10 may be fixed in the wearing state to ensure that the relative position of the portions of the earphone may not change when the portions of the earphone are taken off from the ear (or an ear model is removed). In such cases, a morphology of the earphone in the wearing state is obtained. Further, the second area may be determined based on a projection of the earphone of such morphology on the first plane.

A distance from the ear hook to the sound production component 11 increases when the earphone 10 is in the wearing state such that the second area enclosed by the second closed curve is larger than the first area enclosed by a first closed curve. In some embodiments, to make the sound production component 11 extend into the concha cavity in the wearing state and the ear hook fit the ear better, a difference between the second area and the first area may be in a certain range. For example, the second area may be 20 $mm^2$ to 500 $mm^2$ larger than the first area. In some embodiments, the second area may be 50 $mm^2$-400 $mm^2$ larger than the first area. In some embodiments, the second area may be 60 $mm^2$ to 100 $mm^2$ larger than the first area.

Since the difference between the second area and the first area is in a certain range, a ratio of the projection area of the sound production component 11 on the first plane to the second area of the second closed curve is slightly smaller than a ratio of the projection area of the sound production component 11 on the first plane to the first area of the first closed curve. For example, the ratio of the projection area of the sound production component 11 on the first plane to the second area is in a range of 0.18-0.42. Further, to ensure that the user does not block the opening of the user's ear canal when the user wears the earphone 10 and reduce a load of the user when the user wears the earphone 10 to facilitate the user to obtain an environmental sound or daily communication when the user wears the earphone 10, the ratio of the projection area of the sound production component 11 on the first plane to the second area of the second closed curve is in a range of 0.2-0.35.

For reasons similar to those of the first area, an appropriate second area may ensure a listening volume of the earphone 10 at a listening position (e.g., at the opening of the ear canal), particularly a listening volume at a low-to-mid frequency, and maintain a better cancellation effect of a far-field sound leakage. In some embodiments, the second area is in a range of 1100 $mm^2$-1700 $mm^2$. Further, considering the range of the ratio of the projection area of the sound production component 11 to the second area, the second area may be in a range of 1300 $mm^2$-1650 $mm^2$, to take into account both the listening quality and the sound leakage reduction effect.

In some embodiments, the inner contour, the first end contour, the second end contour, and the tangent segment 50 connecting the first end contour and the second end contour define a fourth closed curve when the earphone 10 is in the wearing state. Similar to the third area, in some embodiments, an area enclosed by the fourth closed curve may be used as an area of a fourth projection (also referred to as a "fourth area"). A difference between the fourth closed curve and the third closed curve may reflect how well the sound production component 11 and the ear hook fit the ear when the earphone 10 is in the wearing state.

In some embodiments, due to a certain degree of elasticity of the ear hook, the distance from the ear hook to the sound production component 11 increases in the wearing state. In such cases, the fourth area formed by the earphone 10 in the wearing state is larger than the third area formed in the non-wearing state. In some embodiments, when the fourth area is too large, the sound production component 11 may not be able to abut against the edge of the concha cavity, resulting in an increase in sound components directly radiated outwards by the sound production component 11 and a decrease in sounds reaching the listening position, which in turn results in a decrease in the sound production efficiency of the sound production component 11. When the fourth area is too small, a clamping force of the ear hook and the sound production component 11 to an auricle of the user may be too large. Therefore, in some embodiments, a ratio of the projection area of the sound production component 11 on the first plane to the fourth area of the fourth closed curve is in a range of 0.46-0.77. Further, to ensure the user's wearing comfort and prevent a too small third area from affecting the sound production component 11 from extending into the concha cavity, the ratio of the projection area of the sound production component 11 to the fourth area is in a range of 0.51-0.72.

In some embodiments, based on the range of the ratio of the projection area of the sound production component 11 to the fourth area, the fourth area of the fourth closed curve is in a range of 350 $mm^2$-900 $mm^2$. Furthermore, an excessively large fourth area may lead to a reduction in the clamping effect of the ear hook and the sound production component 11. In such cases, a self-weight of the earphone 10 is supported by an upper edge of the user's ear, leading to an increase in the foreign body sensation. To ensure the user's wearing comfort and the listening volume of the earphone 10 at the listening position (e.g., at the opening of the ear canal), the fourth area is in a range of 450 $mm^2$-750 $mm^2$.

Referring again to FIGS. 5 and 6, as described above, taking into account differences in a shape and size of ears of different users, by designing the relative size between the first area and the projection area of the auricle on the sagittal plane of the user, the wearing effect of the earphone 10 can be effectively improved. Since the shape and size of the ears of different users may differ, the present disclosure may take an average range of the projection area of the auricle on the sagittal plane of the user as a reference, which is in a range of 1300 $mm^2$-1700 $mm^2$. In some embodiments, a ratio of the projection area of the sound production component 11 on the first plane to the projection area of the auricle on the sagittal plane of the user is in a range of 0.15-0.35. When the ratio of the projection area of the sound production component 11 on the first plane to the projection area of the auricle on the sagittal plane of the user is in the foregoing range, good sound production efficiency and listening effect of the sound production component 11 may be ensured. It should be noted that for some users, the projection area of the auricle on the sagittal plane of the user may be less than 1,300 $mm^2$ or greater than 1,700 $mm^2$ due to the individual variability of the user, and in this case, the ratio of the first area to the projection area of the auricle on the sagittal plane of the user may be greater than 0.33 or less than 0.15. For example, the ratio of the projection area of the sound production component 11 on the first plane to the projection area of the auricle on the sagittal plane of the user is in a range of 0.1-0.38.

As described above, when the user wears the earphone 10, at least a portion of the sound production component 11 thereof may extend into the user's concha cavity, forming an acoustic model shown in FIG. 4. Since the sound production component 11 cannot fit closely with the concha cavity, a gap may be formed, and the gap corresponds to the leakage structure 403 illustrated in FIG. 4. That is, when the earphone 10 is in the wearing state in which the whole or a portion of the sound production component 11 extends into the concha cavity, a projection of the sound production component 11 on the sagittal plane of the user has an overlapping region with a projection of concha cavity on the sagittal plane of the user. Further, a ratio of the overlapping region affects an opening area of the leakage structure 403 of the cavity-like structure 402 in the acoustic model shown in FIG. 4. For example, when an overlapping ratio between the sound production component 11 and the concha cavity is relatively large, the sound production component 11 may cover a larger portion of the concha cavity such that the size of the gap between the sound production component 11 and the concha cavity is small, i.e., the opening area of the leakage structure 403 of the cavity-like structure 402 is small.

Figure 9:
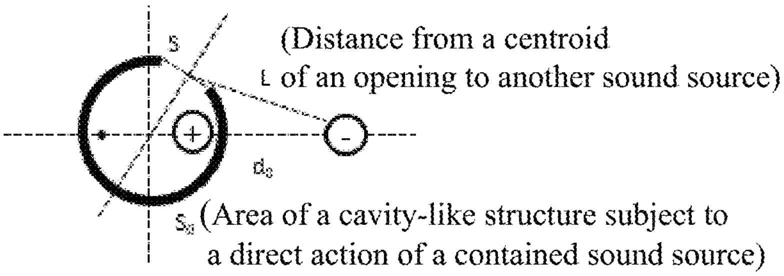
FIG. 9 is a schematic diagram illustrating an exemplary structure of a cavity-like structure according to some embodiments of the present disclosure.
Figure 10:
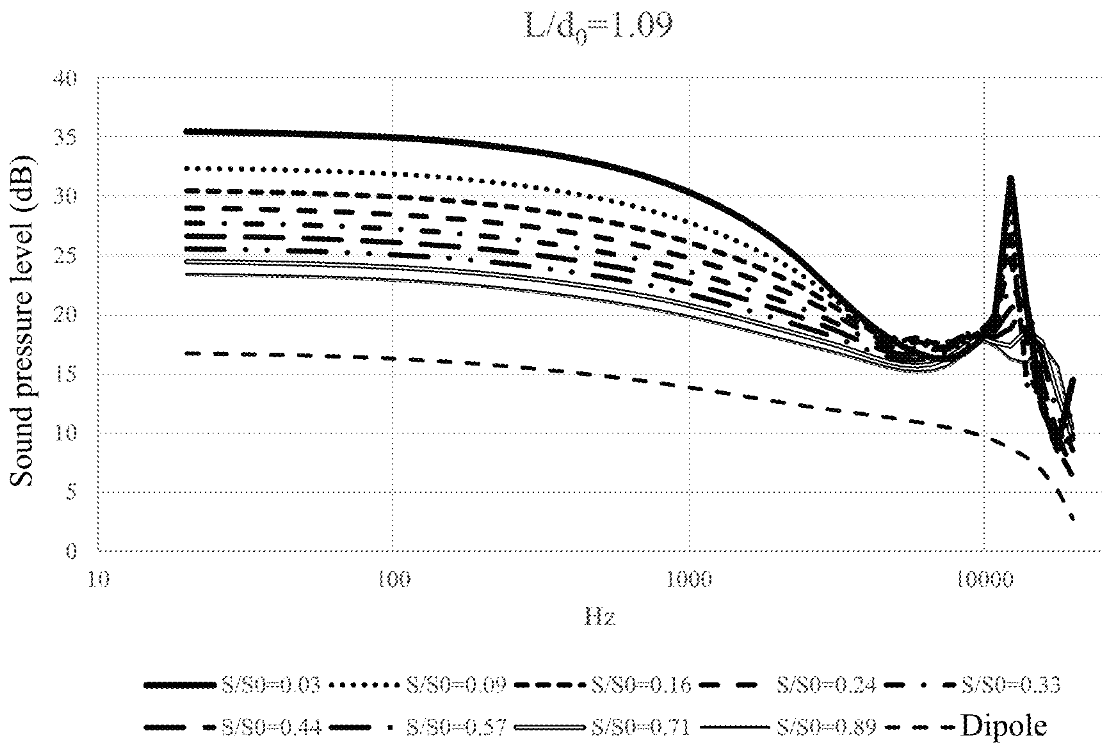
FIG. 10 is a diagram illustrating listening indexes of a cavity-like body structure with leakage structures of different sizes according to some embodiments of the present disclosure.

FIG. 9 is a schematic diagram illustrating an exemplary structure of a cavity-like structure according to some embodiments of the present disclosure; and FIG. 10 is a diagram illustrating listening indexes of a cavity-like structure having leakage structures of different sizes according to some embodiments of the present disclosure. As shown in FIG. 9, an opening area of a leakage structure of a cavity-like structure is S, and an area of the cavity-like structure subject to a direct action of a contained sound source (illustrated in FIG. 9 as "+") is $S_0$. The "direct action" herein refers to that a sound from the contained source is acoustically applied directly to a wall of the cavity-like structure without passing through the leakage structure. A distance between two sound sources is $d_0$, and a distance from a center of an opening shape of the leakage structure to another sound source ("-" as shown in FIG. 9) is L. Keeping $L/d_0=1.09$, as shown in FIG. 10, the larger the relative opening area ($S/S_0$), the smaller the listening index. The listening index herein may refer to an intensity of a sound pressure level measured at a listening position. This is because the larger the relative opening area is, the more sound components are directly radiated outward from the contained sound source, and the less the sound reaching the listening position, which results in a decrease in a listening volume with an increase in the relative opening area, thereby resulting in a decrease in the listening index. It may be deduced that the larger the opening, the lower the listening volume at the listening position. In some embodiments, to ensure the listening volume at an opening of an ear canal when a user wears the earphone 10, an overlapping ratio between a projection area of the sound production component 11 and a projection area of a concha cavity on a sagittal plane of the user (e.g., an area enclosed by a dotted line 1015) may be controlled in a specific range to control a size of the opening. It should be noted that in the embodiments of the present disclosure, the overlapping ratio may be understood as a ratio of an overlapping area between the projection area of the sound production component 11 and a projection area of the concha cavity on the sagittal plane of the user to the projection area of the concha cavity on the sagittal plane of the user.

Figure 11:
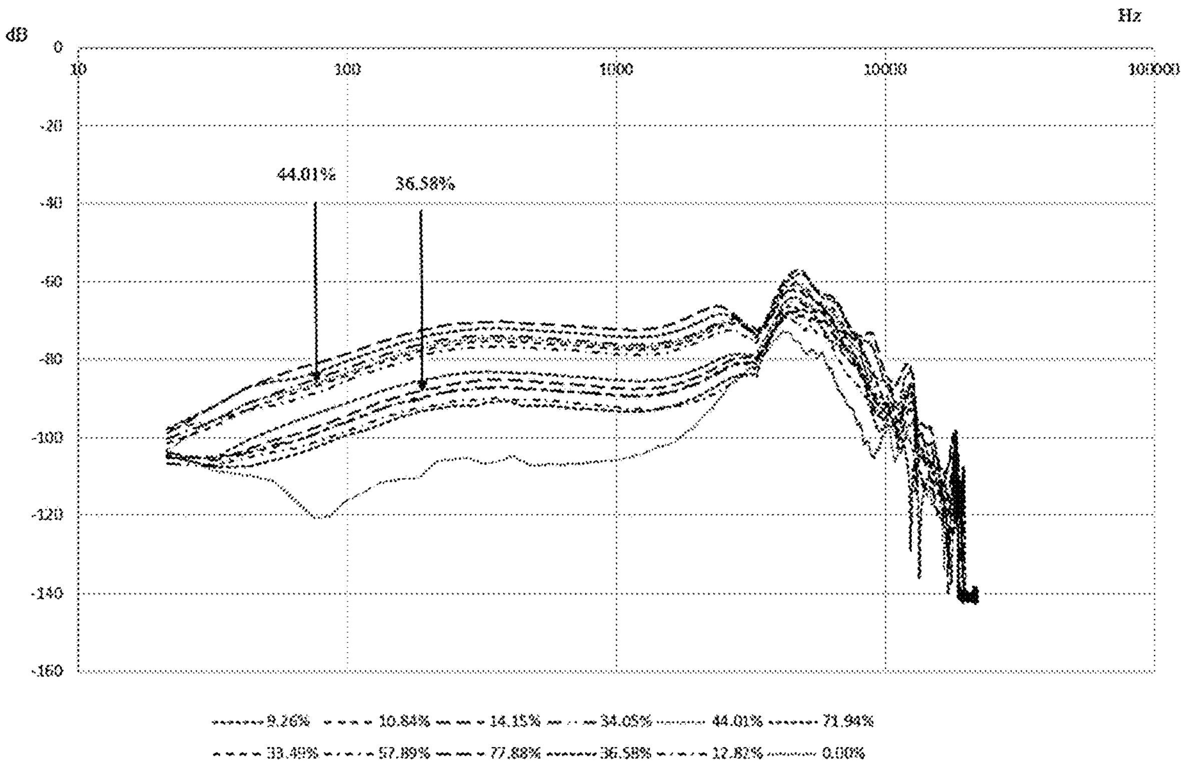
FIG. 11 is a schematic diagram illustrating frequency response curves corresponding to different overlapping ratios between a projection area of a sound production component and a projection area of a user's concha cavity on a sagittal plane according to some embodiments of the present disclosure.

FIG. 11 is a schematic diagram illustrating frequency response curves corresponding to different overlapping ratios between a projection area of the sound production component 11 and a projection area of a user's concha cavity on a sagittal plane of the user according to some embodiments of the present disclosure. In FIG. 11, a horizontal coordinate represents a frequency (Hz), and a vertical coordinate represents a frequency response (dB) at an opening of an ear canal corresponding to the different overlapping ratios. As shown in FIG. 11, when the user wears the earphone 10 and at least a portion of the sound production component 11 covers the concha cavity, i.e., when the projection of the sound production component 11 has an overlapping region with the projection of the concha cavity on the sagittal plane of the user, compared with that when the projection of the sound production component 11 does not have an overlapping region with the projection of the concha cavity on the sagittal plane of the user (the overlapping ratio is 0%), a listening volume at the opening of the user's ear canal may be significantly improved, especially in a low-and-mid frequency range. In some embodiments, to improve the listening effect when the user wears the earphone 10, the overlapping ratio between the projection area of the sound production component 11 and the projection area of the user's concha cavity on the sagittal plane of the user may be not less than 9.26%. Continuing to refer to FIG. 11, as the overlapping ratio between the projection area of the sound production component 11 and the projection area of the user's concha cavity on the sagittal plane of the user continues to increase, the listening volume received by the user at the opening of the ear canal is also improved. In particular, when the overlapping ratio between the projection area of the sound production component 11 and the projection area of the user's concha cavity on the sagittal plane of the user increases from 36.58% to 44.01%, the listening effect has a significant improvement. Based on this, to further improve the listening effect of the user, the overlapping ratio between the projection area of the sound production component 11 and the projection area of the user's concha cavity on the sagittal plane of the user is not less than 44.01%. Further, the overlapping ratio between the projection area of the sound production component 11 and the projection area of the user's concha cavity on the sagittal plane of the user is not less than 57.89%. It is to be noted that the frequency response curves corresponding to the overlapping ratios between the projection area of the sound production component 11 to the projection area of the user's concha cavity on the sagittal plane of the user are measured by changing a wearing position of the sound production component 11 (e.g., by moving the sound production component along a sagittal axis or a vertical axis) when a wearing angle of the sound production component 11 (an angle between an upper or lower sidewall and a horizontal direction) and a size of the sound production component 11 is determined.

The earphone 10 provided in the embodiments of the present disclosure, by extending at least a portion of the sound production component 11 into the concha cavity and controlling the overlapping ratio between the projection area of the sound production component 11 and the projection area of the user's concha cavity on the sagittal plane of the user to be not less than 44.01%, the sound production component 11 may fit better with the user's concha cavity to form an acoustic model shown in FIG. 4, thereby increasing a listening volume of the earphone 10 at a listening position (e.g., at the opening of the ear canal), especially at a low-and-middle frequency. On this basis, a size of a transducer or a battery may be appropriately reduced, which in turn reduces the ratio of the second area to a projection area of the auricle on the sagittal plane of the user. In some embodiments, to ensure that the earphone 10 has a wearing mode that extends into the concha cavity, and that the sound production component 11 has a high sound production efficiency and wearing comfort, the overlapping ratio between the projection area of the sound production component 11 and the projection area of the user's concha cavity on the sagittal plane of the user is not less than 44.01%, and the ratio of the second area to the projection area of the auricle on the sagittal plane of the user is in a range of 0.8-1.1. Further, to enable the sound production component 11 to form a more desirable cavity-like structure with the concha cavity, the overlapping ratio between the projection area of the sound production component 11 and the projection area of the user's concha cavity on the sagittal plane of the user is not less than 57.89%, and the ratio of the second area to the projection area of the auricle on the sagittal plane of the user is in a range of 0.85-1.03. It should be noted that the ratio is based on an average range of the projection area of the auricle on the sagittal plane of the user, which is in a range of 1300 $mm^2$-1700 $mm^2$. For some users, the projection area of the auricle on the sagittal plane of the user may be less than 1300 $mm^2$ or greater than 1700 $mm^2$, and in this case, a ratio of the second area to the projection area of the auricle on the sagittal plane of the user may be greater than 1.1 or less than 0.8, e.g., the ratio of the second area to the projection area of the auricle on the sagittal plane of the user is in a range of 0.65-1.3.

It should also be noted that, to ensure that the earphone 10 does not block the opening of the user's ear canal when the user wears the earphone 10, and to keep the opening of the ear canal in an open state so that the user can obtain sound from an outside environment while obtaining a sound output from the earphone 10, the overlapping ratio between the projection area of the sound production component 11 and the projection area of the concha cavity on the sagittal plane of the user should not be too large. In a wearing state, when the overlapping ratio between the projection area of the sound production component 11 and the projection area of the user's concha cavity on the sagittal plane of the user is too small, a size of the sound production component 11 extending into the concha cavity is too small, which may result in that a fitting area between the sound production component 11 and the user's concha cavity is relatively small, and the concha cavity cannot be utilized to provide sufficient support and restriction to the sound production component 11, thereby resulting in a problem of unstable wearing. In addition, a gap formed between the sound production component 11 and the concha cavity is too large, which may affect the listening volume at the opening of the ear canal. To ensure a stability and comfort of wearing of the earphone 10 and to have a better listening effect without blocking the opening of the user's ear canal, in some embodiments, the overlapping ratio between the projection area of the sound production component 11 and the projection area of the user's concha cavity on the sagittal plane of the user may be in a range of 44.01%-77.88% such that the sound production component 11 may be supported and limited through a force of the concha cavity on the sound production component 11 when the whole or a portion of the sound production component 11 extends into the concha cavity, thereby improving the wearing stability and comfort the earphone. At the same time, the sound production component 11 may also form the acoustic model with the concha cavity as shown in FIG. 4, which ensures the user's listening volume at the listening position (e.g., the opening of the ear canal) and reduces a volume of a far-filed sound leakage. Further, the overlapping ratio between the projection area of the sound production component 11 and the projection area of the user's concha cavity on the sagittal plane of the user may be in a range of 46%-71.94%. Furthermore, the overlapping ratio between the projection area of the sound production component 11 and the projection area of the user's concha cavity on the sagittal plane of the user may be in a range of 57.89%-62%, so that the gap of the cavity-like structure formed between the sound production component 11 and the user's concha cavity is more conducive to increasing the listening volume.

A ratio of the overlapping area between the projection area of the sound production component 11 on the sagittal plane of the user and the projection area of the concha cavity on the sagittal plane of the user to the projection area of the sound production component 11 on the sagittal plane of the user reflects an extension degree of the sound production component 11 into the concha cavity, which in turn affects the sound production efficiency of the sound production component 11. In some embodiments, to ensure a wearing stability and comfort of the earphone 10 and to have a better listening effect without blocking the opening of the user's ear canal, the overlapping ratio between the projection area of the sound production component 11 and the projection area of the user's concha cavity on the sagittal plane of the user may be in a range of 46%-71.94%, and the ratio of the overlapping area between the projection of the sound production component 11 on the sagittal plane of the user and the projection of the concha cavity on the sagittal plane of the user to the projection area of the sound production component 11 on the sagittal plane of the user is not less than 40.4%. Preferably, the overlapping ratio between the projection area of the sound production component 11 and the projection area of the user's concha cavity on the sagittal plane of the user may be in a range of 57.89%-62%, and the ratio of the overlapping area between the projection of the sound production component 11 on the sagittal plane of the user and the projection of the concha cavity on the sagittal plane of the user to the projection area of the sound production component 11 on the sagittal plane of the user may be not less than 42.16% such that the sound production component 11 may extend into an appropriate position in the concha cavity, thus ensuring the listening effect.

Figure 12A:
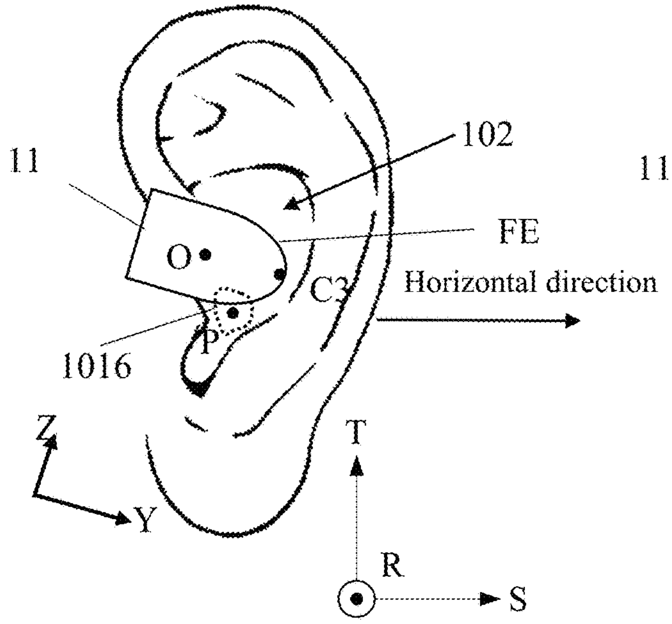
FIG. 12A is a schematic diagram illustrating an exemplary fitting position of an earphone with a user's ear canal according to some embodiments of the present disclosure.
Figure 12B:
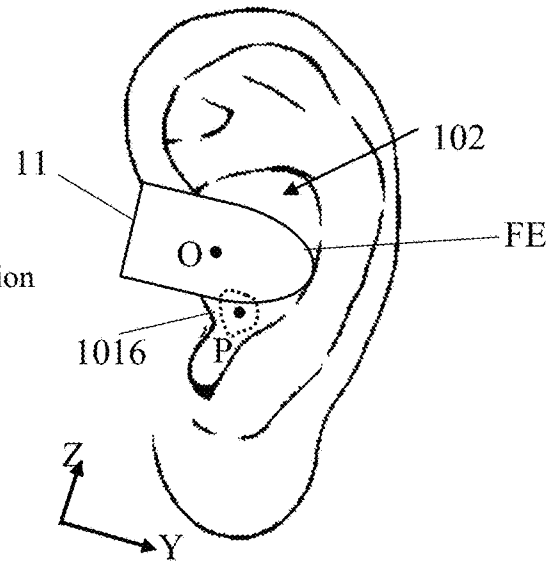
FIG. 12B is a schematic diagram illustrating another exemplary fitting position of an earphone with the user's ear canal according to some embodiments of the present disclosure.
Figure 12C:
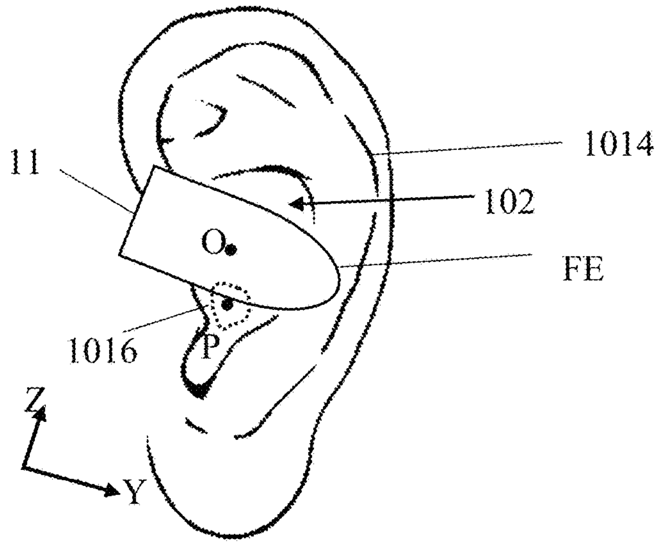
FIG. 12C is a schematic diagram illustrating a further exemplary fitting position of an earphone to a user's ear canal according to some embodiments of the present disclosure.

FIGS. 12A to 12C are schematic diagrams illustrating different fitting positions of the earphone 10 with a user's ear canal according to the present disclosure.

A size of a gap formed between the sound production component 11 and an edge of a concha cavity is also correlated with a distance of an end FE of the sound production component 11 with respect to the edge of the concha cavity, and the distance of the end FE of the sound production component 11 with respect to the edge of the concha cavity may be characterized by a distance from a mid-point of a projection of the end FE of the sound production component 11 on a sagittal plane of the user to a projection of the edge of the concha cavity on the sagittal plane of the user. The concha cavity refers to a region of a concave fossa below the crus of helix, i.e., the edge of the concha cavity at least includes a sidewall below the crus of helix, a contour of a tragus, an intertragic notch, an antitragus tip, a depression between an antitragus and an antihelix, and a contour of an antihelix body that corresponds to the concha cavity. The projection of the edge of the concha cavity on the sagittal plane of the user is a contour of a projection of the concha cavity on the sagittal plane of the user. Specifically, one end of the sound production component 11 is connected to the suspension structure 12 (the second portion 122 of the ear hook), and when the user wears the sound production component 11, a whole or a portion of the sound production component 11 extends into the concha cavity. A position of the end FE (free end) of the sound production component 11 relative to the edge of the concha cavity affects an overlapping ratio between a projection area of the sound production component 11 and a projection area of the concha cavity on the sagittal plane of the user, thereby affecting the size of the gap formed between the sound production component 11 and the concha cavity, which in turn affects a listening volume at an opening of the user's ear canal. Furthermore, a distance from the mid-point of the projection of the end FE of the sound production component 11 on the sagittal plane of the user to the projection of the edge of the concha cavity on the sagittal plane of the user may reflect the position of the end FE of the sound production component 11 relative to the concha cavity and a degree to which the sound production component 11 covers the user's concha cavity. It should be noted that when the projection of the end FE of the sound production component 11 on the sagittal plane of the user is a curve or a folded line, the mid-point of the projection of the end FE of the sound production component 11 on the sagittal plane of the user may be determined in a following exemplary manner: two points with a largest distance along a short-axis direction in the projection of the end FE on the sagittal plane of the user may be selected to obtain a line segment, a mid-point on the line segment may be selected to draw a perpendicular bisector, and a point where the perpendicular bisector intersects with the projection of the end FE may be the mid-point of the projection of the end of the sound production component 11 on the sagittal plane of the user. In some embodiments, when the end FE of the sound production component 11 is a curved plane, a tangent point on the projection of the end FE where a tangent line parallel to the short-axis direction Z is located is selected as the mid-point of the projection of the end FE of the sound production component 11 on the sagittal plane of the user.

As shown in FIG. 12A, when the sound production component 11 dose does not abut against the edge of the concha cavity 102, the end FE of the sound production component 11 is disposed in the concha cavity 102, i.e., the mid-point of the projection of the end FE of the sound production component 11 on the sagittal plane of the user does not overlap with the projection of the edge of the concha cavity 102 on the sagittal plane of the user. As shown in FIG. 12B, the sound production component 11 of the earphone 10 extends into the concha cavity 102, and the end FE of the sound production component 11 abuts against the edge of the concha cavity 102, i.e., the mid-point of the projection of the end FE of the sound production component 11 overlaps with the projection of the edge of the concha cavity 102 on the sagittal plane of the user. As shown in FIG. 12C, the sound production component 11 of the earphone 10 covers the concha cavity, and the end FE of the sound production component 11 is located between the edge of the concha cavity 102 and the inner contour 1014 of an auricle.

Combined with FIGS. 12A to 12C, when the end FE of the sound production component 11 is located within the edge of the concha cavity 102, if the distance from a mid-point C3 of the projection of the end FE of the sound production component 11 on the sagittal plane of the user to the projection of the edge of the concha cavity 102 on the sagittal plane of the user is too large, the overlapping ratio between the projection area of the sound production component 11 and the projection area of the concha cavity on the sagittal plane of the user may be too small, and the size of the gap formed between the sound production component 11 and the edge of the concha cavity 102 may be relatively large, which affects the listening volume at the opening of the user's ear canal. When the mid-point C3 of the projection of the end FE of the sound production component 11 is located between the projection of the edge of the concha cavity 102 on the sagittal plane of the user and a projection of the inner contour 1014 of the auricle on the sagittal plane of the user, if the distance from the mid-point C3 of the projection of the end FE of the sound production component 11 on the sagittal plane of the user to the projection of the edge of the concha cavity 102 on the sagittal plane of the user is too large, the end FE of the sound production component 11 may interfere with the auricle and a ratio of the sound production component 11 covering the concha cavity 102 may not increase. In addition, when worn by the user, if the end FE of the sound production component 11 is not located in the concha cavity 102, the edge of the concha cavity 102 may not act as a limit for the sound production component 11, so the sound production component 11 is prone to fall off. In addition, an increase in a size of the sound production component 11 increases a weight of the sound production component 11, which affects the comfort of the user in wearing the sound production component 11 and the convenience of carrying it around. It should be noted that, when the projection of the end FE of the sound production component 11 on the sagittal plane of the user is the curve or a folded line, the mid-point of the projection of the end FE of the sound production component 11 on the sagittal plane of the user may be determined in a following manner: select beginning and end points of the projection of the end FE on the sagittal plane of the user to draw a line segment, select a mid-point of the line segment and draw a perpendicular bisector, and a point at which the perpendicular bisector intersects with the projection of the end FE is the mid-point of the projection of the end FE of the sound production component 11 on the sagittal plane of the user. In some embodiments, when the end FE of the sound production component 11 is the curved plane, a tangent point on the projection of the end FE where the tangent line parallel to the short-axis direction Z is located is selected as the mid-point of the projection of the end FE of the sound production component 11 on the sagittal plane of the user.

Figure 13:
FIG. 13 is a schematic diagram illustrating frequency response curves corresponding to different distances between a projection of an end of a sound production component on a sagittal plane and a projection of an edge of a concha cavity on the sagittal plane according to some embodiments of the present disclosure.

FIG. 13 is a schematic diagram illustrating exemplary frequency response curves corresponding to different distances between a projection of an end of the sound production component 11 on a sagittal plane of a user and a projection of an edge of a concha cavity on the sagittal plane of the user according to some embodiments of the present disclosure. Referring to FIG. 13, wherein a horizontal coordinate indicates a frequency (Hz), a vertical coordinate indicates a sound pressure level (dB) at an opening of an ear canal at different frequencies, a frequency response curve 1201 is a frequency response curve when the distance between the mid-point C3 of the projection of the end of the sound production component 11 on the sagittal plane of the user and the projection of the edge of the concha cavity is 0 mm (e.g., in a wearing state, an end of the sound production component 11 abuts against the edge of the concha cavity), a frequency response curve 1202 is a frequency response curve when the distance between the mid-point C3 of the projection of the sound production component 11 on the sagittal plane of the user and the projection of the edge of the concha cavity on the sagittal plane of the user is 4.77 mm, a frequency response curve 1203 is a frequency response curve when the distance between the mid-point C3 of the projection of the end of the sound production component 11 on the sagittal plane of the user and the projection of the edge of the concha cavity at 7.25 mm, a frequency response curve 1204 is a frequency response curve when the distance between the mid-point C3 of the projection of the end of the sound production component 11 on the sagittal plane of the user and the projection of the edge of the concha cavity is 10.48 mm, a frequency response curve 1205 is a frequency response curve when the distance between the mid-point C3 of the projection of the end of the sound production component 11 on the sagittal plane of the user and the projection of the edge of the concha cavity is 15.3 mm, and a frequency response curve 1206 is and a frequency response curve when the distance between the mid-point C3 of the projection of the end of the sound production component 11 on the sagittal plane of the user and the projection of the edge of the concha cavity is 19.24 mm. Based on FIG. 13, when a distance from the mid-point C3 of the end of the sound production component 11 on the sagittal plane of the user to the projection the edge of the concha cavity on the sagittal plane of the user is 0 mm (e.g., in the wearing state, the end of the sound production component 11 abuts against the concha cavity), 4.77 mm, and 7.25 mm, respectively, a sound pressure level of a sound measured at the opening of the ear canal is relatively large. When the distance from the mid-point C3 of the projection of the end of the sound production component 11 on the sagittal plane of the user to the projection of the edge of the concha cavity on the sagittal plane of the user is 19.24 mm (e.g., in the wearing state, the end of the sound production component 11 does not abut against the edge of the concha cavity), a sound pressure level of a sound measured at the opening of the ear canal is relatively small. That is to say, in the wearing state, the greater the distance from the mid-point C3 of the projection of the end of the sound production component 11 on the sagittal plane of the user to the projection of the edge of the concha cavity on the sagittal plane of the user, i.e., the less structure of the sound production component 11 extends into the concha cavity, the smaller the overlapping ratio between a projection area of a first projection of the sound production component 11 on the sagittal plane of the user and a projection area of the edge of the concha cavity on the sagittal plane of the user, and the worse the listening effect at the opening of the ear canal. Based on this, to ensure that the earphone 10 has a better listening effect and ensures the comfort and stability when the user wears of the earphone 10, in some embodiments, the distance from the mid-point C3 of the projection of the end FE of the sound production component 11 on the sagittal plane of the user to the projection of the edge of the concha cavity on the sagittal plane of the user is not greater than 16 mm. Further, the distance from the mid-point C3 of the projection of the end FE of the sound production component 11 on the sagittal plane of the user to the projection of the edge of the concha cavity on the sagittal plane of the user is no greater than 13 mm. Furthermore, the distance from the mid-point C3 of the projection of the end FE of the sound production component 11 on the sagittal plane of the user and the projection of the edge of the concha cavity on the sagittal plane of the user may be in a range of 0 mm-10.92 mm. In such cases, the size of the gap in a cavity-like structure formed between the sound production component 11 and the concha cavity of the user is more conducive to improving the listening volume. For example, in some embodiments, the distance from the mid-point C3 of the projection of the end FE of the sound production component 11 on the sagittal plane of the user and the projection of the edge of the concha cavity on the sagittal plane of the user may be in a range of 0 mm-15.3 mm. Further, the distance from the mid-point C3 of the projection of the end FE of the sound production component 11 on the sagittal plane of the user and the projection of the edge of the concha cavity on the sagittal plane of the user may be in a range of 0 mm-10.48 mm. Further, the distance from the mid-point C3 of the projection of the end FE of the sound production component 11 on the sagittal plane of the user and the projection of the edge of the concha cavity on the sagittal plane of the user may be in a range of 0 mm-7.25 mm. Further, the distance from the mid-point C3 of the projection of the end FE of the sound production component 11 on the sagittal plane of the user and the projection of the edge of the concha cavity on the sagittal plane of the user may be in a range of 0 mm-4.77 mm. In some embodiments, the end of the sound production component 11 may abut against the edge of the concha cavity, which may be understood as that the projection of the end FE of the sound production component 11 on the sagittal plane of the user overlaps with a projection of the edge of the concha cavity on the sagittal plane of the user (e.g., the position of the sound production component 11 relative to the concha cavity shown in FIG. 12A), namely, when the distance from the projection of the end of the sound production component 11 on the sagittal plane of the user to the projection of the edge of the concha cavity on the sagittal plane of the user is 0 mm, the sound production component 11 may have a better frequency response, and at this time, the end of the sound production component 11 abuts against the edge of the concha cavity such that the concha cavity may support and limit the sound production component 11, thereby improving the stability of the earphone 10 when the user wears the earphone 10. It should be noted that in some embodiments, the distance from the mid-point C3 of the projection of the end FE of the sound production component 11 on the sagittal plane of the user to the projection of the edge of the concha cavity 102 on the sagittal plane of the user may refer to a smallest distance from the mid-point C3 of the projection of the end FE of the sound production component 11 on the sagittal plane of the user to the projection of the edge of the concha cavity 102 on the sagittal plane of the user. In some embodiments, the distance from the mid-point C3 of the projection of the end FE of the sound production component 11 on the sagittal plane of the user to the projection of the edge of the concha cavity 102 on the sagittal plane of the user may also refer to a distance along a sagittal axis. In addition, the distance from the projection of the end of the sound production component 11 on the sagittal plane of the user to the projection of the edge of the concha cavity on the sagittal plane of the user in FIG. 13 are measured when the end of the sound production component 11 extends into the concha cavity. It should be noted that, in a specific wearing scenario, points other than the mid-point C3 on the projection of the end FE of the sound production component 11 on the sagittal plane of the user abut against the edge of the concha cavity. In such cases, the distance from the mid-point C3 of the projection of the end FE on the sagittal plane of the user to the projection of the edge of the concha cavity on the sagittal plane of the user may be greater than 0 mm. Preferably, the distance from the mid-point C3 of the end FE of the sound production component 11 to the projection of the edge of the concha cavity on the sagittal plane of the user may be 2 mm-16 mm. Furthermore, the distance from the mid-point C3 of the projection of the end FE of the sound production component 11 on the sagittal plane of the user to the edge of the concha cavity on the sagittal plane of the user may be in a range of 4 mm-10.48 mm such that the size of the gap in the cavity-like structure formed between the sound production component 11 and the concha cavity of the user is more conducive to increasing the listening volume. In addition, the concha cavity 102 is a concave-fossa structure, a corresponding sidewall of the concha cavity 102 is not a flat wall, the projection of the edge of the concha cavity on the sagittal plane of the user is an irregular two-dimensional shape, and a projection of the corresponding sidewall of the concha cavity 102 on the sagittal plane of the user may be on or outside a contour of the shape. In such cases, the mid-point of the projection of the end FE of the sound production component 11 on the sagittal plane of the user and the projection of the edge of the concha cavity 102 on the sagittal plane of the user may overlap or may not overlap with each other. For example, the mid-point of the projection of the end FE of the sound production component 11 on the sagittal plane of the user may be inside or outside the projection of the edge of the concha cavity 102 on the sagittal plane of the user. In embodiments of the present disclosure, when the end FE of the sound production component 11 is disposed in the concha cavity 102, the distance from the mid-point of the projection of the end FE of the sound production component 11 on the sagittal plane of the user to the edge of the concha cavity 102 being in a specific range (e.g., not greater than 6 mm) may be regarded as that the end FE of the sound production component 11 abuts against the edge of the concha cavity 102.

In some embodiments, when a distance from the projection of the end of the sound production component 11 to the projection of the edge of the concha cavity is in a suitable range, a higher sound production efficiency may be obtained. In such cases, a size of a transducer or a battery may be appropriately reduced, which may lower the ratio of the second area to the projection area of the auricle on the sagittal plane of the user. In some embodiments, the distance from the projection of the end of the sound production component 11 to the projection of the edge of the concha cavity on the sagittal plane of the user is not greater than 16 mm, and the ratio of the second area to the projection area of the auricle on the sagittal plane of the user is in a range of 0.8-1.1. In some embodiments, the distance from the projection of the end of the sound production component 11 to the projection of the edge of the concha cavity on the sagittal plane of the user is in a range of 0 mm-15.3 mm, and the ratio of the second area to the projection area of the auricle on the sagittal plane of the user is in a range of 0.76-1.05, so as to reduce a sound leakage from the cavity-like structure formed between the sound production component 11 and the user's ear to the outside, thereby allowing more sound to enter into the ear canal and ensuring the listening effect.

It is to be noted that, the frequency response curves corresponding to the different distances between the midpoint of the projection of the end FE of the sound production component 11 and the projection of the edge of the concha cavity on the sagittal plane of the user in some embodiments of the present disclosure are obtained by changing a wearing position of the sound production component 11 (e.g., moving in the sagittal axis direction) when a wearing angle (an angle between an upper sidewall or lower sidewall and a horizontal direction), and a size along a long-axis direction, a size along a short-axis direction, and a size along a thickness direction of the sound production component 11 are constant.

Figure 7:
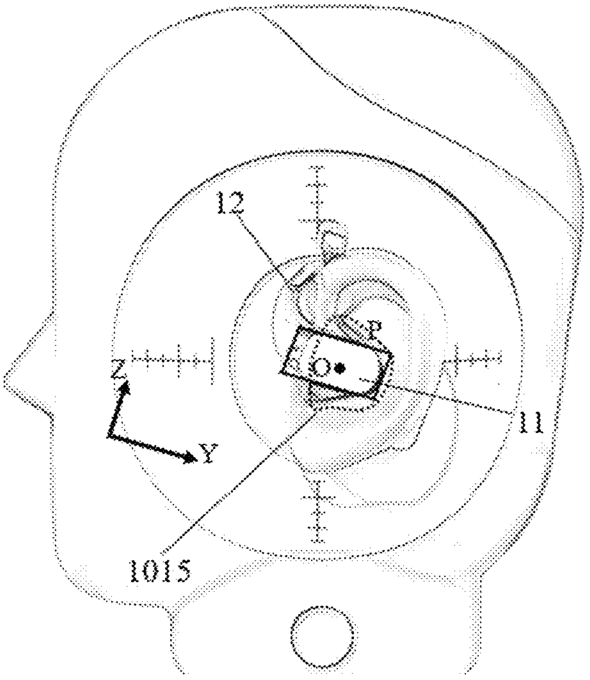
FIG. 7 is a schematic diagram illustrating an exemplary wearing of an earphone according to some embodiments of the present disclosure.

For the convenience of description, a rectangular region shown by a solid line box P may be delineated around the projection of the sound production component 11 in FIG. 7, and a centroid O of the rectangular region shown by the solid line box P may be approximated as a centroid of the projection of the sound production component 11. It should be noted that the above description of the projection of the sound production component 11 and the centroid thereof is only intended to serve as an example, and a projection shape of the sound production component 11 is related to a shape of the sound production component 11 or a wearing situation of the sound production component 11 with respect to the ear.

In some embodiments, with reference to FIGS. 12A-FIG. 12C, when the earphone 10 is in the wearing state, the projection of the sound production component 11 and a projection (e.g., a dashed region 1016 shown in FIGS. 12A-FIG. 12C) of the opening of the ear canal on the sagittal plane of the user may at least partially overlap with each other. A distance from the centroid O of the projection of the sound production component 11 to a centroid P of the projection of the opening of the ear canal on the sagittal plane of the user may reflect a relative position relationship between the sound production component 11 and the opening of the ear canal as well as an overlapping ratio between the projection area of the sound production component 11 and a projection area of the opening of the ear canal opening on the sagittal plane of the user. The overlapping ratio may affect a count of leakage structures of the cavity-like structure formed by the sound production component 11 and the ear of the user and an opening size of the leakage structure, and the opening size of the leakage structure may affect the listening quality directly. Specifically, the larger the opening size of the leakage structure, the more sound components radiated from the sound production component 11 to the outside directly, and the less the sound reaching a listening position.

Figure 14A:
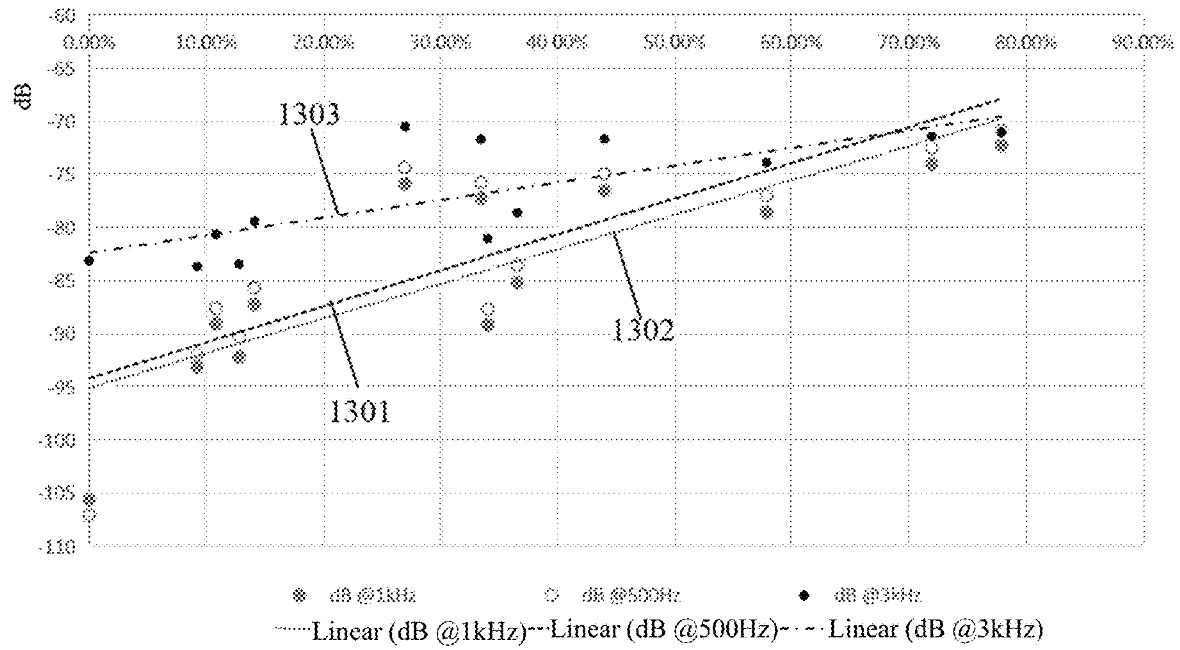
FIG. 14A is a schematic diagram illustrating frequency response curves corresponding to different overlapping ratios between a projection area of a first projection and a projection area of a user's concha cavity on a sagittal plane according to some embodiments of the present disclosure.
Figure 14B:
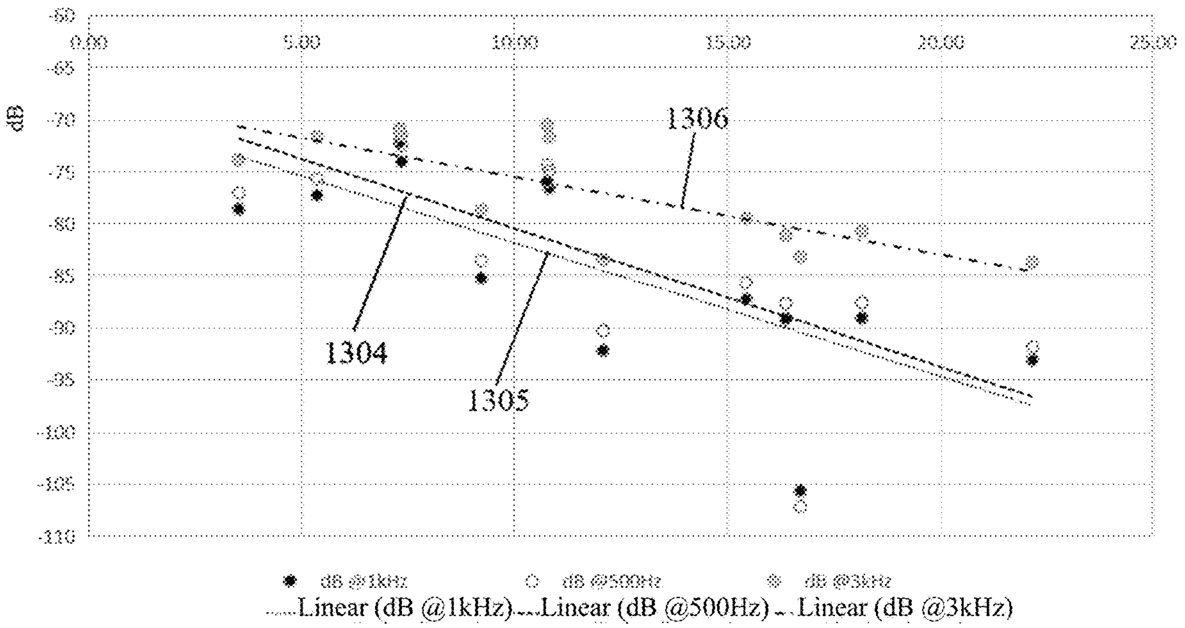
FIG. 14B is a schematic diagram illustrating frequency response curves corresponding to different distances between a centroid of a first projection and a centroid of a projection of an opening of an ear canal on a sagittal plane according to some embodiments of the present disclosure.

FIG. 14A is a schematic diagram illustrating frequency response curves corresponding to different overlapping ratios between a projection area of the sound production component 11 and a projection area of a concha cavity on a sagittal plane of a user according to some embodiments of the present disclosure. FIG. 14B is a schematic diagram illustrating exemplary frequency response curves corresponding to different distances between a centroid of a projection of the sound production component 11 and a centroid of a projection of an opening of an ear canal on a sagittal plane of a user according to some embodiments of the present disclosure.

Referring to FIG. 14A, a horizontal coordinate is an overlapping ratio between the projection area of the sound production component 11 and the projection area of the concha cavity on the sagittal plane of the user, a vertical coordinate is a sound pressure level of a sound at the opening of the ear canal corresponding to different overlapping ratios, and a straight line 1301 represents a linear relationship obtained by fitting the sound pressure level at the opening of the ear canal and the overlapping ratio between an area of the first projection and the projection area of the concha cavity on the sagittal plane of the user at a frequency of 500 Hz; a straight line 1322 represents a linear relationship obtained by fitting the sound pressure level at the opening of the ear canal and the overlapping ratio between the area of the first projection and the projection area of the concha cavity on the sagittal plane of the user at a frequency of 1 kHz; the straight line 1303 represents a linear relationship obtained by fitting the sound pressure level at the opening of the ear canal and the overlapping ratio between the area of the first projection and the projection area of the concha cavity on the sagittal plane of the user at a frequency of 3 kHz. Hollow circular dots in FIG. 14A represent test data corresponding to different overlapping ratios between the area of the first projection and the projection area of the concha cavity on the sagittal plane of the user at 500 Hz; circular dots in lighter grey in FIG. 14A are test data corresponding to different overlapping ratios between the area of the first projection and the projection area of the concha cavity on the sagittal plane of the user at a frequency of 1 kHz; and black circular dots in FIG. 14A represent test data corresponding to different overlapping ratios between the area of the first projection and the projection area of the concha cavity on the sagittal plane of the user at a frequency of 3 kHz. According to FIG. 14A, at different frequencies, the overlapping ratio between the area of the first projection and the projection area of the concha cavity on the sagittal plane of the user is approximately positively correlated with the sound pressure level at the opening of the ear canal of the user, and when the projection area of the sound production component 11 overlaps with the projection area of the concha cavity on the sagittal plane of the user, a sound of a particular frequency (e.g., 500 Hz, 1 kHz, 3 kHz) measured at the opening of the ear canal has a significant enhancement with respect to the case when the projection area of the sound production component 11 does not overlap with the projection area of the concha cavity on the sagittal plane of the user (the overlapping ratio is 0). Based on this, to ensure the acoustic output quality of the sound production component 11, an overlapping ratio between the projection area of the sound production component 11 and the projection area of the concha cavity on the sagittal plane of the user may be in a range of 44.01%-80%. In conjunction with FIG. 14A, the sound pressure level of the sound at the opening of the ear canal is relatively large when the overlapping ratio is 22% or 32%, but a structure of the sound production component 11 that extends into the concha cavity is limited, and the edge of the concha cavity cannot support and limit the end of the sound production component 11. When the overlapping ratio is too large (e.g., the overlapping ratio is greater than 80%), although the sound pressure level of the sound at the opening of the ear canal is large, an open state of the opening of the ear canal may be affected. Further, in some embodiments, the overlapping ratio between the projection area of the sound production component 11 and the projection area of the concha cavity on the sagittal plane of the user may be in a range of 45%-71.49%, so as to balance the communication of the opening of the ear canal with an external environment and the listening effect.

Referring to FIG. 14B, a horizontal coordinate is the distance from the centroid O of the projection of the sound production component 11 and the centroid P of the projection of the opening of the ear canal on the sagittal plane of the user, and a vertical coordinate is a sound pressure level of a sound at the opening of the ear canal corresponding to different distances. A straight line 1304 represents a linear relationship obtained by fitting the distance from the centroid O of the projection of the sound production component 11 to the centroid P of the projection of the opening of the ear canal on the sagittal plane of the user and a sound pressure level at the opening of the ear canal at a frequency of 500 Hz; a line 1305 represents a linear relationship obtained by fitting the distance from the centroid O of the projection of the sound production component 11 to the centroid P of the projection of the opening of the ear canal on the sagittal plane of the user and a sound pressure level at the opening of the ear canal at a frequency of 1 kHz; and a line 1306 represents a linear relationship obtained by fitting the distance from the centroid O of the projection of the sound production component 11 to the centroid P of the projection of the opening of the ear canal on the sagittal plane of the user and a sound pressure level at the opening of the ear canal at a frequency of 3 kHz. Hollow circular dots in FIG. 14B show test data corresponding to different distances between the centroid O of the projection of the sound production component 11 and the centroid P of the projection of the opening of the ear canal on the sagittal plane of the user at a frequency of 500 Hz; black circular dots in FIG. 14B show test data corresponding to different distances between the centroid O of the projection of the sound production component 11 and the centroid P of the projection of the opening of the ear canal on the sagittal plane of the user at a frequency of 1 kHz, and circular dots in lighter grey in FIG. 14B show test data corresponding to different distances between the centroid O of the projection of the sound production component 11 and the centroid P of the projection of the opening of the ear canal on the sagittal plane of the user at a frequency of 3 kHz. According to FIG. 14B, at different frequencies, the distance from the centroid O of the projection of the sound production component 11 to the centroid P of the projection of the opening of the ear canal on the sagittal plane of the user is approximately negative correlated with the sound pressure level at the opening of the ear canal of the user. The sound pressure level of a sound measured at the opening of the ear canal at a particular frequency (e.g., 500 Hz, 1 kHz, 3 kHz) tends to decrease as the distance from the centroid O of the projection of the sound production component 11 to the centroid P of the projection of the opening of the ear canal on the sagittal plane of the user increases. In combination with FIG. 14A and FIG. 14B, the larger the distance from the centroid O of the projection of the sound production component 11 to the centroid P of the projection of the opening of the ear canal on the sagittal plane of the user, the smaller the overlapping ratio between the projection area of the sound production component 11 and the projection area of the opening of the ear canal on the sagittal plane of the user. The overlapping ratio may affect a count of leakage structures of a cavity-like structure formed by the sound production component 11 and the ear of the user and an opening size of the leakage structure, and the opening size of the leakage structure may affect the listening quality directly. Specifically, the larger the opening size of the leakage structure, the more sound components radiated from the sound production component 11 to the outside directly, and the less sound reaching a listening position. Additionally, when the distance from the centroid O of the projection of the sound production component 11 to the centroid P of the projection of the opening of the ear canal on the sagittal plane of the user is too small, the overlapping ratio between the projection area of the sound production component 11 and the projection area of the opening of the ear canal on the sagittal plane of the user may be too large, and the sound production component 11 may cover the opening of the ear canal, which may affect the user's access to sound and information in an external environment. According to FIG. 14B, taking a frequency of 3 kHz as an example, when the distance from the centroid O of the projection of the sound production component 11 to the centroid P of the projection of the opening of the ear canal on the sagittal plane of the user is 7 mm and 11 mm, respectively, a sound pressure level measured at the opening of the ear canal is ~72 dB and ~70 dB, respectively, when the distance from the centroid O of the projection of the sound production component 11 to the centroid P of the projection of the opening of the ear canal on the sagittal plane of the user is 18 mm and 22 mm, respectively, a sound pressure level measured at the opening of the ear canal is ~80 dB and ~84.3 dB, respectively. In such cases, the distance from the centroid O of the projection of the sound production component 11 to the centroid P of the projection of the opening of the ear canal on the sagittal plane of the user should not be too large. In some embodiments, to ensure the acoustic output quality of the sound production component 11 (e.g., a sound pressure level is greater than ~80 dB at the opening of the ear canal) while ensuring that the user can receive sound and information in the external environment, the distance from the centroid O of the projection of the sound production component 11 to the centroid P of the projection of the opening of the ear canal on the sagittal plane of the user may be in a range of 3 mm-15 mm. Further, the distance from the centroid O of the projection of the sound production component 11 to the centroid P of the projection of the opening of the ear canal on the sagittal plane of the user may be in a range of 4 mm-13 mm. Furthermore, the distance from the centroid O of the projection of the sound production component 11 to the centroid P of the projection of the opening of the ear canal on the sagittal plane of the user may be in a range of 8 mm-10 mm, so as to ensure a listening volume at the opening of the ear canal.

In some embodiments, when the distance from the centroid O of the projection of the sound production component 11 to the centroid P of the projection of the opening of the ear canal on the sagittal plane of the user is in a suitable range, a higher sound production efficiency may be obtained. In such cases, a size of a transducer or a battery may be reduced, which may reduce the ratio of the second area to the projection area of the auricle on the sagittal plane of the user. In some embodiments, the distance from the centroid O of the projection of the sound production component 11 to the centroid P of the projection of the opening of the ear canal on the sagittal plane of the user may be in a range of 4 mm-13 mm, and the ratio of the second area to the projection area of the auricle on the sagittal plane of the user may be in a range of 0.88-1.2. In some embodiments, the distance from the centroid O of the projection of the sound production component 11 to the centroid P of the projection of the opening of the ear canal on the sagittal plane of the user may be in a range of 8 mm-12 mm and the ratio of the second area to the projection area of the auricle on the sagittal plane of the user may be in a range of 0.8-1.1, so as to reduce a sound leakage from the cavity-like structure formed by the sound production component 11 and the user's ear to the outside, thereby allowing more sound to enter the ear canal and ensuring the listening effect.

It should be noted that, the frequency response curves corresponding to different overlapping ratios and the frequency response curves corresponding to different distances between the centroid of the first projection and the centroid of the projection of the opening of the ear canal on the sagittal plane of the user in the embodiments of the present disclosure are obtained by changing the wearing position of the sound production component 11 (e.g., moving in the sagittal axis direction) when a wearing angle (an angle between the upper sidewall or lower sidewall and the horizontal direction), a size along the long-axis direction, a size along the short-axis direction, and size along thickness direction of the sound production component 11 are constant.

It should be noted that a positional relationship between the sound production component 11 and the auricle, the concha cavity, or the opening of the ear canal in sone embodiments of the present disclosure may be determined in a following exemplary manner: firstly, a photograph of a head model having an ear is taken at a specific position along the direction facing a sagittal plane, and a contour of an edge of the concha cavity, a contour of the opening of the ear canal, and a contour of the auricle (e.g., an inner contour and an outer contour) are labeled, wherein the labeled contours are regarded as a projection contour of each structure of the ear on the sagittal plane of the user; then, a photograph of the earphone 10 in the wearing state on the head model is taken at the particular position and at a same angle, a contour of the sound production component 11 is labeled, wherein the contour may be regarded as the projection of the sound production component 11 on the sagittal plane of the user, and the positional relationship between the sound production component 11 (e.g., the centroid, the end, etc.) and the edge of the concha cavity, the opening of the ear canal, the inner contour, or the outer contour may be determined by comparative analysis.

Figure 15:
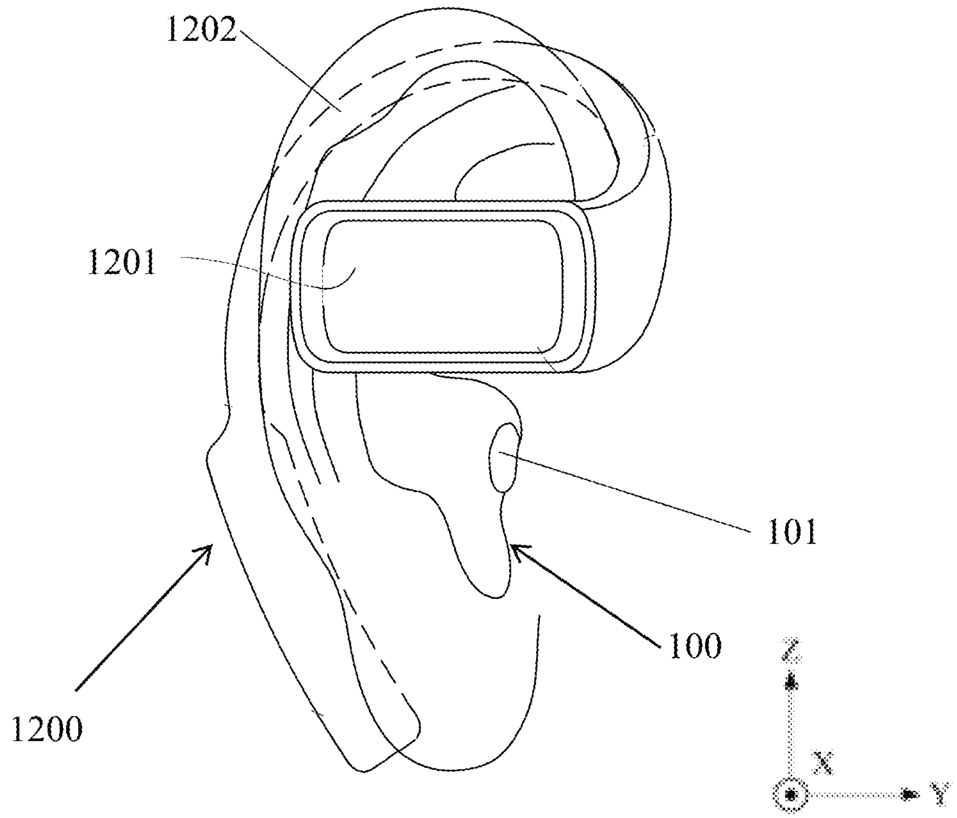
FIG. 15 is a schematic diagram illustrating an exemplary wearing of an earphone according to some embodiments of the present disclosure.

FIG. 1 to FIG. 14B and corresponding contents thereof are with respect to a situation in which a whole or a portion of the sound production component of the earphone extends into the concha cavity when the earphone is in the wearing state, and the sound production component may not extend into the concha cavity in some embodiments. For example, at least a portion of the sound production component 1201 shown in FIG. 15 covers an antihelix region. As another example, the sound production component 1201 may be disposed suspended relative to the concha cavity. The following is a detailed description of an earphone 1200 as shown in FIG. 15. It is to be understood that a structure of the earphone 1200 in FIG. 15 and corresponding parameters thereof may be equally applicable to the earphone referred to in the above description in which the sound production component extends into the concha cavity without violating a corresponding acoustic principle.

Figure 16:
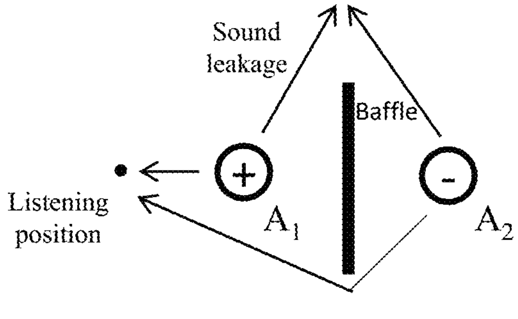
FIG. 16 is a schematic diagram illustrating an acoustic model formed by an earphone according to some embodiments of the present disclosure.

By placing at least a portion of the sound production component 1201 at the user's antihelix 105, the output effect of the earphone 1200 may be increased, i.e., an intensity of a sound at a near-field listening position may be increased, while a volume of sound leakage in a far-field may be reduced. When the user wears the earphone 1200, one or more sound outlet holes may be provided on a side of a casing of the sound production component 1201 near or facing the user's ear canal, and at least one other sidewall (e.g., a sidewall away from or back from the user's ear canal) of the casing of the sound production component 1201 may be provided with one or more pressure relief holes. The sound outlet hole(s) may be acoustically coupled to a front cavity of the earphone 1200, and the pressure relief hole(s) may be acoustically coupled to a rear cavity of the earphone 1200. Taking the sound production component 1201 including one sound outlet hole and one pressure relief hole as an example, a sound output from the sound outlet hole and a sound output from the pressure relief hole may be approximated as two sound sources, which are equal in amplitude and opposite in phase. The sound from the sound outlet hole may be delivered unobstructed directly to the opening of the user's ear canal, and the sound from the pressure relief hole needs to pass the casing of the sound production component 1201 or through the sound production component 1201 to form an acoustic model similar to that shown in FIG. 16. As shown in FIG. 16, when a baffle is provided between a point source A1 and a point source A2, in a near field, a sound field of the point source A2 needs to bypass the baffle to interfere with the sound wave of the point source A1 at a listening position, which is equivalent to increasing a sound path from the point source A2 to the listening position. Assuming that the point sound source A1 and the point sound source A2 have a same amplitude, an amplitude difference between the sound wave of the point sound source A1 and the sound wave of the point sound source A2 at the listening position may be larger than that in a case without a baffle, which may reduce a sound cancellation of the two sound waves at the listening position, thereby increasing a sound volume at the listening position. In the far field, the sound waves generated by the point sound source A1 and the point sound source A2 may interfere with each other without bypassing the baffle in a relatively large space (similar to the case without the baffle), then the volume of sound leakage in the far-filed may not significantly increase compared to the case without the baffle. Therefore, a baffle structure around one of point sound source A1 and point sound source A2 may significantly increase a volume at a near-field listening position without significantly increasing the volume of sound leakage in the far-field.

Figure 17:
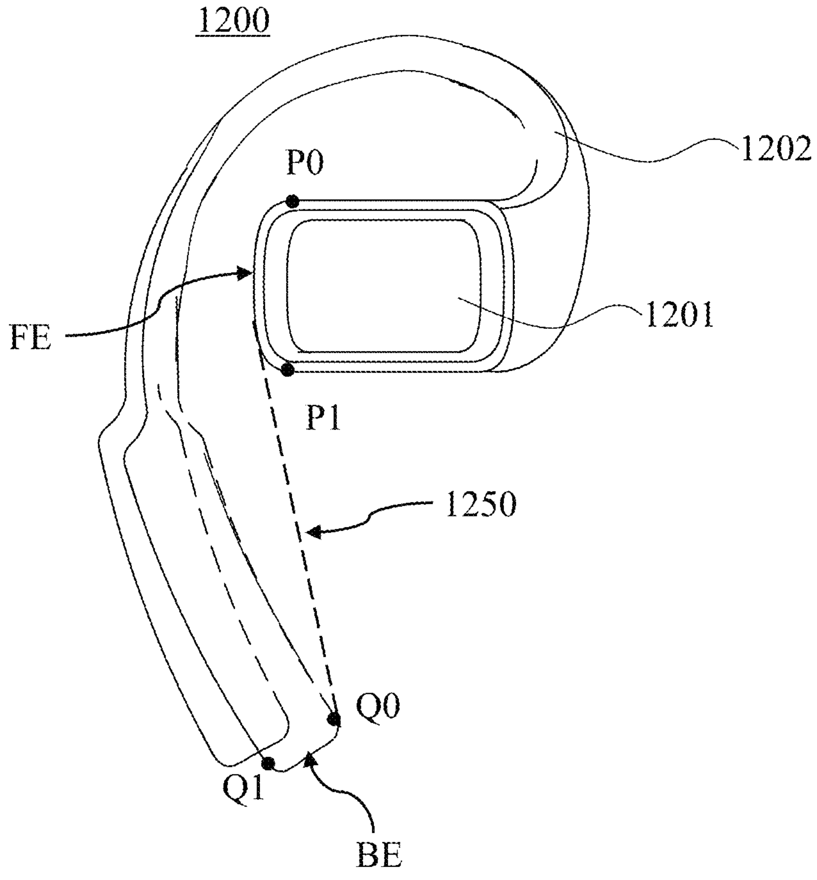
FIG. 17 is a schematic diagram illustrating an earphone in a wearing state and an earphone in a non-wearing state according to some embodiments of the present disclosure.

As shown in FIG. 17, an ear hook 1202 and the sound production component 1201 form a fifth projection on a first plane, the fifth projection including an outer contour, a first end contour, an inner contour, and a second end contour. Similar to a structure of the earphone 10 in FIG. 3, the first end contour on the fifth projection may be a contour of a projection of an end FE of the sound production component 1201 on the first plane, and two end points P0 and P1 of the first end contour may be projection points of an intersection of between the end FE with other portions of the sound production component 1201 on the first plane. The second end contour may be a contour of a projection of a free end BE of the suspension structure 1202 on the first plane, and two end points Q0 and Q1 of the second end contour may be projection points of an intersection between the free end BE with other portions of the suspension structure 12 on the first plane. The outer contour may be a contour where the first projection lies between the point P1 and the point Q1. The inner contour may be a contour of the fifth projection between the point P0 and the point Q0. A determination of the end FE and the free end BE of the suspension structure 1202 may be found in the relevant description of the earphone 10 (e.g., in the relevant descriptions of FIGS. 3 and 5 of the present disclosure).

Taking a projection of the sound production component 1201 on the first plane being an approximate rectangle (e.g., a runway shape) as an example, in the projection of the sound production component 1201, there are parallel or approximately parallel projections of upper sidewall and lower sidewall, and the first end contour connecting the projections of upper in the projection of the sound production component 1201 and lower sidewall, the first end contour may be a straight line segment or a circular arc, with points P0 and P1 indicating two ends of the first end contour. Merely by way of example, the point P0 may be a junction point between an arc formed by the projection of the free end of the sound production component 1201 and a line segment of the projection of the upper sidewall, and similar to the point P0, the point P1 may be a junction point between an arc formed by the projection of the free end of the sound production component 1201 and a line segment of the projection of the lower sidewall. Similarly, an end of the ear hook 1202 away from the sound production component 1201 also has a free end, and a projection of the free end of the ear hook 1202 on the first plane forms the second end contour, the second end contour may be a straight line segment or an arc, and the points Q0 and Q1 denote two ends of the second end contour. In some embodiments, the points Q0 and Q1 may be two end points of a line segment or arc of a projection of a free end of a first portion of the ear hook 1202 away from a second portion of the ear hook on the first plane, along the long-axis direction Y of the sound production component 1201, an end point near the sound production component 1201 is the point Q0, and an end point away from the sound production component 1201 is the point Q1.

As shown in FIG. 15, a projection shape of the earphone 1200 on the first plane and on the sagittal plane of the user may reflect how the earphone 1200 is worn at an ear. For example, an area of the first projection may reflect a region of the auricle that the earphone 1200 may cover in the wearing state, as well as a manner in which the sound production component 1201 and the ear hook 1202 contact the ear. In some embodiments, since the sound production component 1201 is not in contact with the first portion of the ear hook 1202, the inner contour, the outer contour, the first end contour, and the second end contour of the first projection may form a non-enclosed region. A size of the region is closely related to the wearing effect of the earphone 1200 (e.g., stability of wearing, a position of sound production, etc.). For ease of understanding, in some embodiments, a tangent segment 1250 connecting the first end contour and the second end contour may be determined, and an area enclosed by a fifth closed curve jointly defined by the tangent segment 1250, the outer contour, the first end contour, and the second end contour is an area of the fifth projection (also referred to as a "fifth area").

In some embodiments, a difference between the earphone 1200 and the earphone 10 shown in FIG. 5 may include that the sound production component 1201 of the earphone 1200 is placed at the user's antihelix 105 in the wearing state, and thus the fifth area is less than the first area. In some embodiments, the fifth area may be 0.2 times to 0.6 times the first area. In some embodiments, the fifth area may be 0.3 times to 0.5 times the first area. The fifth area of the fifth closed curve may be in a range of 250 $mm^2$-1000 $mm^2$. To ensure the sound production efficiency of the sound production component 1201 as well as a moderate clamping force, and to avoid the feeling of a foreign body generated by the earphone 1200 in the wearing state, the range of the fifth area of the fifth closed curve is in a range of 400 $mm^2$-800 $mm^2$. In some embodiments, to make the sound production component 1201 close to the antihelix when the user wears the earphone 1200, reduce a load of the user while wearing the earphone 1200, and facilitate the user to obtain an environmental sound or daily communication when wearing the earphones 1200 in daily life, in some embodiments, in a non-wearing state, a ratio of the projection area of the sound production component 1201 on the sagittal plane of the user to the fifth area of the earphone 1200 is in a range of 0.3-0.85. In some embodiments, the ratio of the projection area of the sound production component 1201 on the sagittal plane of the user to the fifth area is in a range of 0.4-0.75.

In a wearing manner in which at least a portion of the sound production component 1201 covers the user's antihelix, since the sound production component 1201 does not extend into the user's concha cavity, an angle between the sound production component 1201 and the sagittal plane of the user is slightly smaller than that of a wearing manner in which the at least a portion of the sound production component 1201 of the earphone shown in FIG. 3 extends into the concha cavity. Therefore, in the wearing manner in which the at least a portion of the sound production component 1201 covers the user's antihelix region, a projection area of the sound production component 1201 of the earphone shown in FIG. 15 on the sagittal plane of the user is slightly larger than that of the sound production component 11 in the wearing manner in which the at least a portion of the sound production component 1201 extends into the concha cavity. For example, in some embodiments, the projection area of the sound production component 1201 on the sagittal plane of the user in the wearing state may be in a range of 236 $mm^2$-565 $mm^2$. In some embodiments, to prevent the baffling effect from being too poor due to the small projection area of the sound production component 1201, and at the same time avoid that the projection area of the sound production component 1201 is too large to cover the opening of the ear canal and affect the user's access to the sound in the external environment, the projection area of the sound production component 1201 on the sagittal plane of the user in the wearing state may be in a range of 250 $mm^2$-550 $mm^2$. In some embodiments, the projection area of the sound production component 1201 on the sagittal plane of the user may be in a range of 320 $mm^2$-410 $mm^2$.

Referring also to FIGS. 3 and 15, in some embodiments, the projection area of the sound production component 1201 on the first plane is slightly larger than the projection area of the sound production component 11 of the earphone 10 on the sagittal plane of the user, and a projection area of the earphone 1200 on the first plane is slightly larger than the projection area of the earphone 10 on the first plane. In some embodiments, the projection area of the earphone 1200 on the first plane is in a range of 550 $mm^2$-1220 $mm^2$. Furthermore, the projection area of the earphone 1200 on the first plane is in a range of 650 $mm^2$-1050 $mm^2$ to ensure a comfortable wearing of the earphone 1200.

In some embodiments, in a manner in which the at least a portion of the sound production component 1201 covers the user's antihelix, the sound production component 1201 may provide a higher listening volume at the listening position with a relatively small volume. Meanwhile, to prevent the baffling effect from being too poor due to the small projection area of the sound production component 1201, in the non-wearing state, a ratio of the projection area of the sound production component 1201 on the first plane to the projection area of the earphone 1200 on the first plane is in a range of 0.33-0.69. In some embodiments, the projection area of the sound production component 1201 on the first plane may be in a range of 250 $mm^2$-550 $mm^2$, and the ratio of the projection area of the sound production component 1201 on the first plane to the projection area of the earphone 1200 on the first plane is in a range of 0.4-0.65. In some embodiments, the projection area of the sound production component 1201 on the first plane may be in a range of 320 $mm^2$-410 $mm^2$, and the ratio of the projection area of the sound production component 1201 on the first plane to the projection area of the earphone 1200 on the first plane is in a range of 0.44-0.62, so as to improve the sound production efficiency of the sound production component.

Considering differences in shapes and sizes of ears of different users, the wearing effect of the earphone can be effectively enhanced by designing a relative size between the projection area of the sound production component 1201 and a projection area of the auricle on the sagittal plane of the user. In some embodiments, a ratio of the projection area of the sound production component 1201 on the first plane to the projection area of the auricle on the sagittal plane of the user when the earphone is in the non-wearing state is in a range of 0.17-0.35. It should be noted that the ratio is based on an average range of the projection area of the auricle on the sagittal plane of the user as a reference, which is in a range of 1300 $mm^2$-1700 $mm^2$ for some users. For some users, the projection area of the auricle on the sagittal plane of the user may be less than 1300 $mm^2$ or greater than 1700 $mm^2$ due to individual differences of the users. In such cases, the ratio of the projection area of the sound production component 1201 on the first plane to the projection area of the auricle on the sagittal plane of the user may be greater than 0.35 or less than 0.17, for example, the ratio of the projection area of the sound production component 1201 on the first plane to the projection area of the auricle on the sagittal plane of the user is in a range of 0.12-0.39.

FIG. 17 is a diagram illustrating earphone 1200 in a wearing state and a non-wearing state according to some embodiments of the present disclosure. A dashed area represents a first portion of an ear hook of an earphone in a wearing state, which is farther away from a free end of the sound production component 1201 than the first portion of the ear hook in a non-wearing state. In the wearing state, the ear hook 1202 and the sound production component 1201 form a sixth projection on the sagittal plane of the user, and similar to the fifth projection illustrated in the figures, the sixth projection also comprises an outer contour, a first end contour, an inner contour, and a second end contour. The outer contour, the first end contour, the second end contour, and the tangent segment 1250 connecting the first end contour and the second end contour define a second closed curve. As described above, a projection shape of the earphone 1200 on the first plane is similar to a projection shape of the earphone 1200 on the sagittal plane of the user. Therefore, in the sixth projection, boundary points of the contour in the non-wearing state, i.e., the point P0, the point P1, the point Q0, and the point Q1, may be used to describe the determination of each contour in the third projection. In other words, the definition of the outer contour, the first end contour, the inner contour, the second end contour, and the tangent segment 1250 connecting the first end contour and the second end contour are similar to that of the fifth projection, which is not repeated herein. An area enclosed by the sixth closed curve is considered to be an area of the sixth projection (also referred to as a "sixth area"). In some embodiments, the sixth area may reflect how well the earphone 1200 fits the user's ear in the wearing state.

If a ratio of the fifth area to the sixth area is too large, a clamping force on the user's ear may be too small, which may lead to unstable wearing. If the ratio of the fifth area to the sixth area is too small, the elasticity of the ear hook may be relatively poor, which makes it inconvenient for the user to wear the earphone and causes a foreign body sensation in the ear in the wearing state. Accordingly, in some embodiments, to ensure proper elasticity of the ear hook 1202, the ratio of the fifth area to the sixth area is in a range of 0.6-0.98. In some embodiments, since the sound production component 1201 and the ear hook 1202 do not need to be clamped to the auricle as shown in FIG. 5, the ratio of the fifth area to the sixth area is in a range of 0.75-0.95.

For reasons similar to those of the fifth area, an appropriate sixth area ensures the listening volume of the earphone 1200 at a listening position (e.g., at an antihelix) and maintains a better cancellation effect of far-field sound leakage. In some embodiments, the sixth area is in a range of 400 $mm^2$-1100 $mm^2$. In some embodiments, considering the elasticity of the ear hook 1202, the sixth area is in a range of 500 $mm^2$-900 $mm^2$.

In some embodiments, based on a relationship between the fifth area and the sixth area described above, a ratio of the projection area of the sound production component 1201 on the first plane to the sixth area of the sixth closed curve is slightly less than a ratio of the projection area of the sound production component 1201 on the first plane to the fifth area of the fifth closed curve. Correspondingly, the ratio of the projection area of the sound production component 1201 on the first plane to the sixth area is in a range of 0.35-0.75. Meanwhile, to ensure a good listening effect of the earphone, the ratio of the projection area of the sound production component 1201 to the sixth area is in a range of 0.38-0.66.

Figure 18:
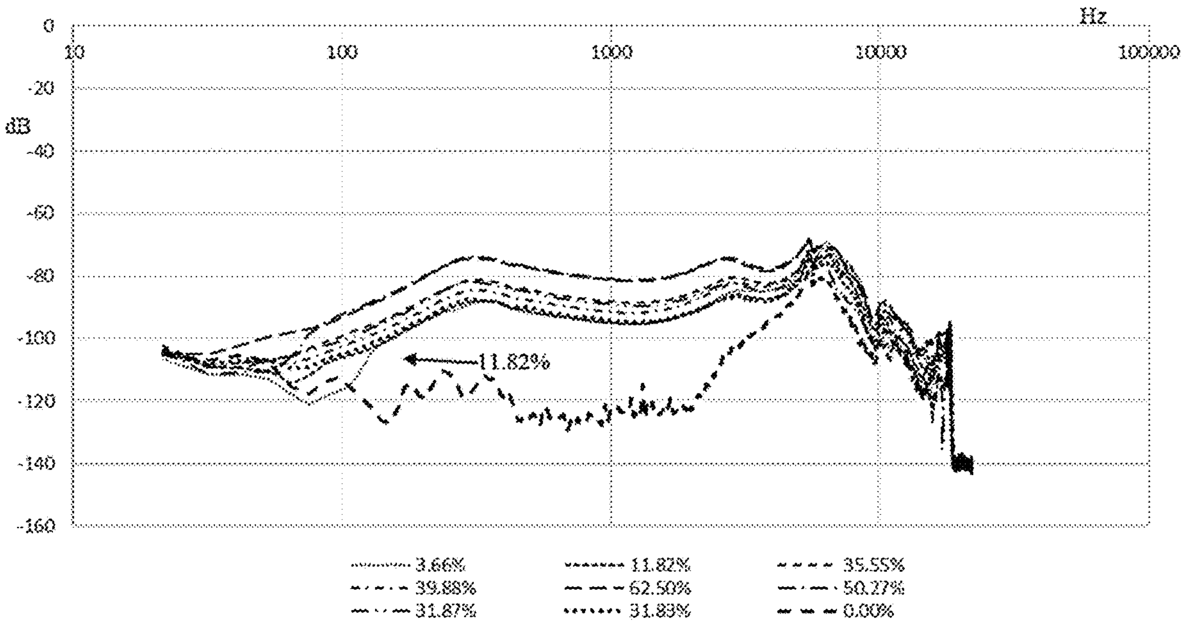
FIG. 18 is a schematic diagram illustrating frequency response curves corresponding to different overlapping ratios between a projection area of a sound production component and a projection area of a user's concha cavity on a sagittal plane according to some embodiments of the present disclosure.

FIG. 18 is a schematic diagram illustrating frequency response curves corresponding to different overlapping ratios between a projection of the sound production component 1201 on a sagittal plane of a user and a projection of a concha cavity on the sagittal plane of the user when at least a portion of the sound production component 1201 covers an antihelix region according to some embodiments of the present disclosure. In FIG. 18, a horizontal coordinate indicates a frequency (Hz), and a vertical coordinate indicates a sound pressure level (dB) measured at an opening of an ear canal at different frequencies. According to FIG. 18, in a specific experiment, since a three-dimensional structure and an overall dimension of the sound production component 1201 is constant, to ensure that the projection area of the sound production component 1201 is a constant value, data corresponding to different overlapping ratios is measured by moving the sound production component 1201 along a sagittal axis and/or a vertical axis. A position of the sound production component 1201 changes with respect to the antihelix region when the sound production component 1201 is moved, and correspondingly, the baffling effect of the sound production component 1201 and the antihelix region may be weakened. In the wearing state, a sound outlet hole is usually provided on a sidewall of the sound production component 1201 close to or facing the opening of the ear canal. In such cases, the larger the overlapping ratio between the projection area of the sound production component 1201 on the sagittal plane of the user and the projection area of the concha cavity on the sagittal plane of the user, the closer the sound outlet hole of the sound production component 1201 to the opening of the ear canal, and thus a listening volume at the opening of the ear canal may be enhanced even if the baffling effect of the antihelix region and the sound production component 1201 is weakened. Continuing to refer to FIG. 18, when the overlapping ratio between the projection area of the sound production component 1201 on the sagittal plane of the user to the projection area of the concha cavity on the sagittal plane of the user is not less than 11.82%, compared to a situation in which the overlapping ratio is less than 11.82%, the listening volume at the opening of the ear canal has a significant improvement, i.e., the sound production component 1201 may have a better frequency response even when a portion of the sound production component 1201 covers both the concha cavity and the antihelix region. Based on this, in some embodiments, to improve the listening effect of the user wearing the earphone, the sound production component 1201 needs to cover the antihelix region while also meeting a requirement that the overlapping ratio between the projection area of the sound production component 12021 on the sagittal plane and the projection area of the concha cavity on the sagittal plane is not less than 11.82%. Further, in some embodiments, the overlapping ratio between the projection area of the sound production component 1201 on the sagittal plane of the user and the projection area of the user's concha cavity on the sagittal plane may not less than 31.83%. Considering that if the overlapping ratio between the projection area of the sound production component 1201 on the sagittal plane of the user and the projection area of the concha cavity on the sagittal plane of the user is too large, the sound production component 1201 may cover the opening of the ear canal such that the opening of the ear canal may not be in a fully open state, which may affect the user's access to a sound in an external environment, in some embodiments, the overlapping ratio between the projection area of the sound production component 1201 on the sagittal plane of the user and the projection area of the user's concha cavity on the sagittal plane may be in a range of 11.82%-62.50%. Further, in some embodiments, the overlapping ratio between the projection area of the sound production component 1201 on the sagittal plane of the user and the projection area of the user's concha cavity on the sagittal plane may be in a range of 31.83%-50.07%. Further, the overlapping ratio between the projection area of the sound production component 1201 on the sagittal plane of the user and the projection area of the user's concha cavity on the sagittal plane may be in a range of 35.55%-45%. It should be noted that the frequency response curves corresponding to the overlapping ratios between the projection area of the sound production component 1201 on the sagittal plane of the user and the projection area of the concha cavity on the sagittal plane in the embodiments of the present disclosure are measured by changing a wearing position (e.g., moving the sound production component 1201 along the sagittal axis or vertical axis) of the sound production component 1201 when a wearing angle of the sound production component 1201 (an angle between an upper sidewall or a lower sidewall and the horizontal direction, e.g., the angle between the upper sidewall and the horizontal direction is 0°) and a size of the sound production component 1201 is constant.

In some embodiments, an increase in the overlapping ratio between the projection area of the sound production component 1201 on the sagittal plane of the user and the projection area of the user's concha cavity on the sagittal plane of the user may improve the sound production efficiency. In such cases, a size of a transducer or a battery may be reduced, which may reduce a ratio of the sixth area to the projection area of the auricle on the sagittal plane of the user. In some embodiments, to ensure that the earphone 10 has a wearing manner in which at least a portion of the sound production component 11 covers the antihelix, and that the sound production component 1201 has high sound production efficiency and good wearing comfort, the ratio of the projection area of the sound production component 1201 on the first plane to the projection area of the sixth area is in a range of 0.35-0.75. Further, to ensure the wearing comfort of the earphone 1200, the ratio of the projection area of the sound production component 1201 on the first plane to the sixth area is in a range of 0.35-0.62.

In some embodiments, a ratio of an overlapping area between a projection of the sound production component 1201 on the sagittal plane of the user and a projection of the concha cavity on the sagittal plane of the user to the projection area of the sound production component 1201 on the sagittal plane of the user may reflect a position of the sound production component 1201 with respect to the concha cavity, which in turn correlates with the sound production efficiency of the sound production component 1201. In some embodiments, to ensure the wearing stability and comfort of the user wearing the earphone and make the earphone have a better sound production efficiency without blocking the opening of the ear canal, a ratio of the overlapping region between the projection of the sound production component 1201 on the sagittal plane of the user and the projection of the concha cavity on the sagittal plane of the user to the projection area of the sound production component 1201 on the sagittal plane of the user is not less than 10.6%. In some embodiments, to further improve the wearing comfort of the earphone, the ratio of the overlapping region between the projection of the sound production component 1201 on the sagittal plane of the user and the projection of the concha cavity on the sagittal plane of the user to the projection area of the sound production component 1201 on the sagittal plane of the user is not less than 11.18%. Further, when the size of the transducer or the battery is appropriately reduced, the ratio of the sixth area to the projection area of the concha cavity on the sagittal plane of the user is in a range of 0.3-0.5, and the ratio of the overlapping region between the projection area of the sound production component 1201 on the sagittal plane of the user and the projection area of the concha cavity on the sagittal plane of the user to the projection area of the sound production component 1201 on the sagittal plane of the user is not less than 13.68%, so as to ensure the listening effect when the at least a portion of the sound production component covers the antihelix.

Figure 19A:
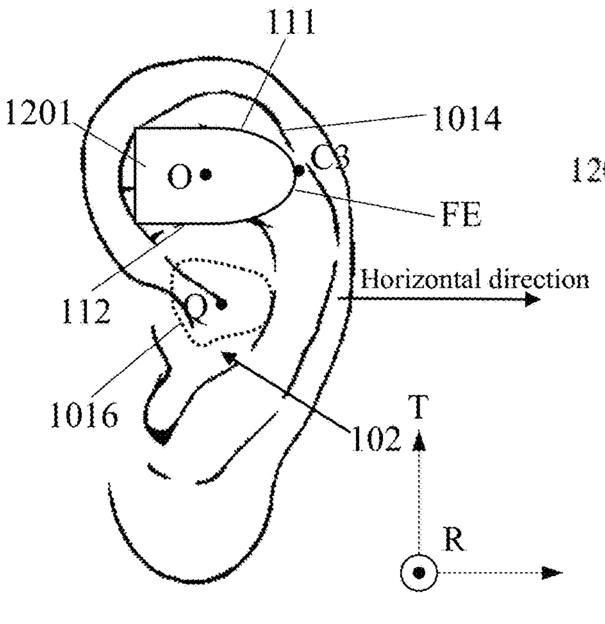
FIG. 19A is a schematic diagram illustrating an exemplary wearing of an earphone according to some embodiments of the present disclosure.
Figure 19B:
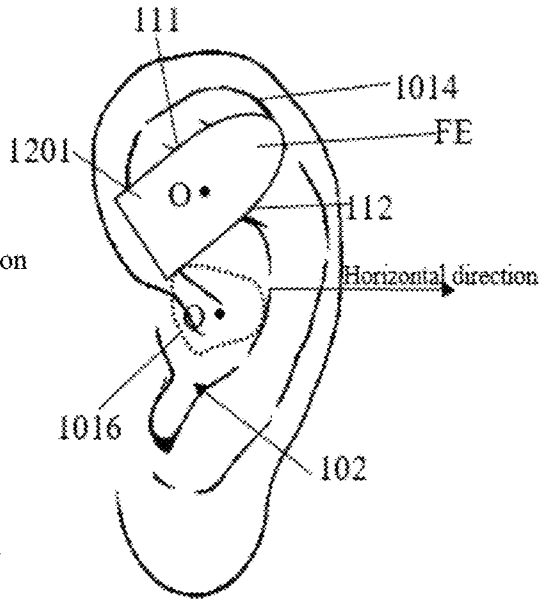
FIG. 19B is a diagram illustrating an exemplary wearing of another earphone according to some embodiments of the present disclosure.
Figure 19C:
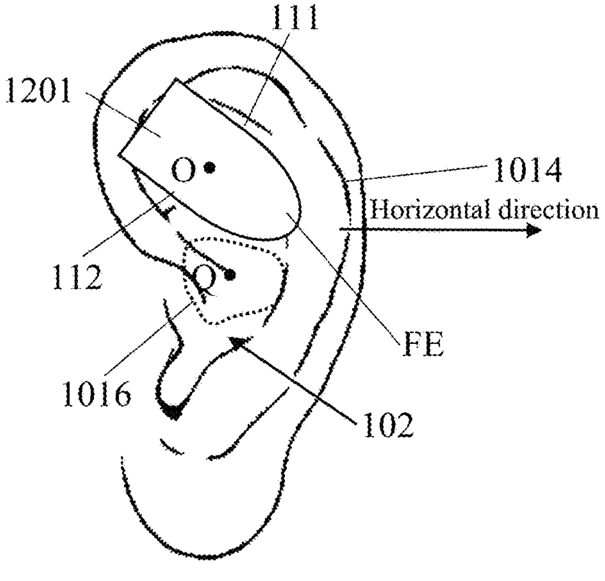
FIG. 19C is a schematic diagram illustrating an exemplary wearing of another earphone according to some embodiments of the present disclosure.
Figure 19D:
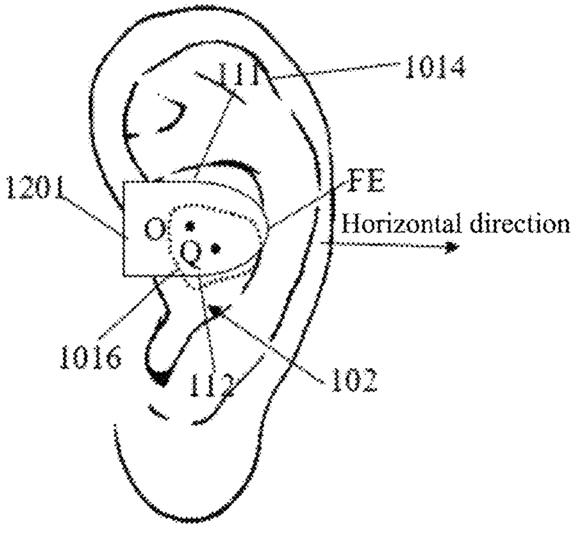
FIG. 19D is a diagram illustrating an exemplary wearing of another earphone according to some embodiments of the present disclosure.
Figure 19E:
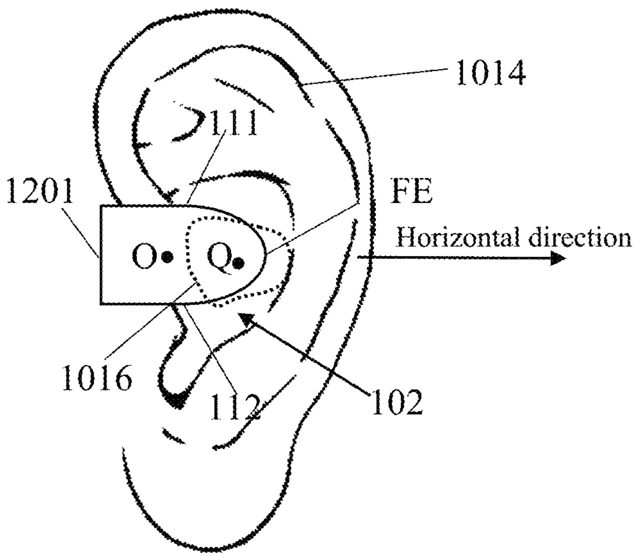
FIG. 19E is a diagram illustrating an exemplary wearing of another earphone according to some other embodiments of the present disclosure.

FIGS. 19A to 19E are schematic diagrams illustrating exemplary wearing of an earphone according to some embodiments of the present disclosure. Referring to FIGS. 19A, 19D, and 19E, in some embodiments, a projection of an end FE of the sound production component 1201 on the sagittal plane of a user may be located in a region between a projection of an inner contour 1014 of an auricle on the sagittal plane of the user and a projection of an edge of the concha cavity 102 on the sagittal plane of the user, that is, a mid-point of the projection of the end FE of the sound production component 1201 on the sagittal plane of the user is located between the projection of the inner contour 1014 of the auricle on the sagittal plane of the user and the projection of the edge of the concha cavity 102 on the sagittal plane of the user. As shown in FIG. 19D, in some embodiments, the end FE of the sound production component 1201 may abut against the edge of the concha cavity 102, a fixed end of the sound production component 1201 may be disposed on a front side of a tragus, and at least a portion of the sound production component 1201 may cover the concha cavity 102 of the user. As shown in FIG. 19E, in some embodiments, the mid-point of the projection of the end FE of the sound production component 1201 on the sagittal plane of the user may be located in a projection of the concha cavity 102 on the sagittal plane of the user, and a projection of the fixed end of the sound production component 1201 on the sagittal plane may be located outside a projection of the auricle on the sagittal plane of the user.

Referring to FIGS. 19B and 19C, in some embodiments, in the wearing state, an upper sidewall 111 or a lower sidewall 112 of the sound production component 1201 may be inclined at an angle relative to a horizontal plane. As shown in FIG. 19B, in some embodiments, the end FE of the sound production component 1201 may be inclined toward a top region of the auricle relative to the fixed end of the sound production component 1201, and the end FE of the sound production component 1201 may abut against the inner contour 1014 of the auricle. As shown in FIG. 19C, in some embodiments, the fixed end of the sound production component 1201 may be inclined toward a top region of the auricle relative to the end FE of the sound production component 1201, and the end FE of the sound production component 1201 may be located between the edge of the concha cavity 102 and the inner contour 1014 of the auricle, that is, the mid-point C3 of the projection of the end FE of the sound production component 1201 on the sagittal plane of the user is located between the projection of the inner contour 1014 of the auricle on the sagittal plane of the user and the projection of the edge of the concha cavity 102 on the sagittal plane of the user.

It can be understood that, in the wearing state, if a distance from the mid-point C3 of the projection of the end FE of the sound production component 1201 on the sagittal plane of the user to the projection of the inner contour of the auricle 1014 on the sagittal plane of the user is too large, the end FE of the sound production component 1201 may not abut against the inner contour 1014 of the auricle such that the inner contour 1014 of the auricle may not limit the sound production component 1201, making the sound production component prone to fall off. Additionally, if a distance from the centroid O of a first projection to a point in a region of a boundary of the second projection is too large, a gap may form between the end FE of the sound production component 1201 and the inner contour 1014 of the auricle, and a sound emitted from a sound outlet hole and a sound emitted from a pressure relief hole may have an acoustic short circuit in a region between the end FE of the sound production component 1201 and the inner contour 1014 of the auricle, resulting in a decrease in a listening volume at an opening of an ear canal of the user. And the larger the region between the end FE of the sound production component 1201 and the inner contour 1014 of the auricle, the more pronounced the acoustic short circuit. It should be noted that the inner contour 1014 of the auricle may refer to an inner wall of a helix, and correspondingly, an outer contour of the auricle may refer to an outer wall of the helix. In some embodiments, to provide the earphone with better wearing stability, the distance from the mid-point C3 of the projection of the end FE of the sound production component 1201 on the sagittal plane of the user to the projection of the inner contour 1014 of the auricle is not greater than 8 mm. Further, the distance from the mid-point C3 of the projection of the end FE of the sound production component 1201 on the sagittal plane of the user to the projection of the inner contour 1014 of the auricle on the sagittal plane of the user may be in a range of 0 mm-6 mm. Moreover, the distance from the mid-point C3 of the projection of the end FE of the sound production component 1201 on the sagittal plane of the user to the projection of the inner contour 1014 of the auricle on the sagittal plane of the user may be in a range of 0 mm-5.5 mm. In some embodiments, the distance from the mid-point C3 of the projection of the end FE of the sound production component 1201 to the projection of the inner contour 1014 of the auricle may be 0. When the distance is 0, which means that the end FE of the sound production component 1201 abuts against the inner contour 1014 of the auricle, the sound production component 1201 abuts against the inner contour 1014 of the auricle in the wearing state, so as to improve the stability of the earphone in the wearing state. Additionally, the region between the end FE of the sound production component 1201 and the inner contour 1014 of the auricle may be as small as possible to minimize a region of acoustic short circuit around the sound production component 1201, so as to improve the listening volume at the opening of the user's ear canal. It should be noted that, in a specific scenario, points other than the mid-point C3 of the projection of the end FE of the sound production component 1201 on the sagittal plane of the user may abut against the inner contour 1014 of the auricle, then the distance from the mid-point C3 of the projection of the end FE of the sound production component 1201 on the sagittal plane of the user to the projection of the inner contour 1014 of the auricle on the sagittal plane of the user may be greater than 0 mm. In some embodiments, the distance from the mid-point C3 of the projection of the end FE of the sound production component 1201 on the sagittal plane of the user to the projection of the inner contour 1014 of the auricle on the sagittal plane of the user may be in a range of 2 mm-10 mm. Further, the distance from the mid-point C3 of the projection of the end FE of the sound production component 1201 on the sagittal plane of the user to the projection of the inner contour 1014 of the auricle on the sagittal plane of the user may be in a range of 4 mm-8 mm.

It should also be noted that, in the present disclosure, the end FE of the sound production component 1201 refers to an end of the sound production component 1201 away from a connection between the sound production component 1201 and an ear hook, and when the projection of the end FE of the sound production component 1201 on the sagittal plane of the user is a curve or a folded line, the mid-point C3 of the projection of the end FE of the sound production component 1201 on the sagittal plane of the user may be determined in a following manner: select beginning and end points of the projection of the end FE on the sagittal plane of the user to draw a line segment, select a mid-point of the line segment and draw a perpendicular bisector, and a point at which the perpendicular bisector intersects with the projection of the end FE is the mid-point C3 of the projection of the end FE of the sound production component 11 on the sagittal plane of the user. In some embodiments, when the end FE of the sound production component 11 is the curved plane, a tangent point on the projection of the end FE where the tangent line parallel to the short-axis direction Z is located is selected as the mid-point of the projection of the end FE of the sound production component 11 on the sagittal plane of the user.

Alternatively, in some embodiments of the present disclosure, the distance from the mid-point of the projection of the end FE of the sound production component 1201 on the sagittal plane of the user to the projection of the inner contour 1014 of the auricle on the sagittal plane of the user may refer to a minimum distance from the projection of the end FE of the sound production component 1201 on the sagittal plane of the user to the projection of the inner contour 1014 of the auricle on the sagittal plane of the user. Or, the distance from the mid-point C3 of the projection of the end FE of the sound production component 1201 on the sagittal plane of the user to the projection of the inner contour 1014 of the auricle on the sagittal plane of the user may refer to a distance from the mid-point C3 of the projection of the end FE of the sound production component 1201 on the sagittal plane of the user to the projection of the inner contour 1014 of the auricle on the sagittal plane of the user along the sagittal axis.

A length of a baffle formed by the sound production component 1201 and the antihelix region is related to a range of the distances from the mid-point C3 of the projection of the end FE of the sound production component 1201 on the sagittal plane of the user to the projection of the inner contour 1014 of the auricle on the sagittal plane of the user. For example, the smaller the distance from the mid-point C3 of the projection of the end FE of the sound production component 1201 on the sagittal plane of the user to the projection of the inner contour 1014 of the auricle on the sagittal plane of the user, the longer the length of the baffle formed by the sound production component 1201 and the antihelix region, the greater the sound path difference between the sound path from the sound outlet hole to the external ear canal 101 and the sound path from the pressure relief hole to the external ear canal 101, and the greater the intensity of the sound received at the external ear canal 101.

In some embodiments, a shape of the sound production component 1201 may be a regular shape such as a rectangular body, a rectangular-like body (e.g., runway-shaped), a cylinder, or other irregular shapes. Referring to FIGS. 19A, 19D, and 19E, in some embodiments, when the sound production component 1201 is a rectangle-like structure, the upper sidewall 111 or the lower sidewall 112 of the sound production component 1201 in the wearing state may be parallel or approximately parallel relative to a horizontal direction. At this time, the distance from the mid-point C3 of the projection of the end FE of the sound production component 1201 on the sagittal plane of the user to the projection of the inner contour 1014 of the auricle on the sagittal plane of the user is in a range of 0 mm-18 mm. Exemplarily, when a wearing manner as shown in FIG. 19A is adopted, the distance from the mid-point C3 of the projection of the end FE of the sound production component 1201 on the sagittal plane of the user to the projection of the inner contour 1014 of the auricle on the sagittal plane of the user may be in a range of 0 mm-11 mm; when a wearing manner as shown in FIG. 19D is adopted, the distance from the mid-point C3 of the end FE of the sound production component 1201 on the sagittal plane of the user to the projection of the inner contour 1014 of the auricle on the sagittal plane of the user may be in a range of 3 mm-12 mm; when a wearing manner as shown in FIG. 19E is adopted, the distance from the mid-point C3 of the end FE of the sound production component 1201 on the sagittal plane of the user to the projection of the inner contour 1014 on the sagittal plane of the user may be in a range of 8 mm-12 mm. In some embodiments, when the earphone is in the wearing state, the end FE of the sound production component 1201 may abut against the inner contour 1014 of the auricle, and at the same time, the ear hook may fit a rear side of the user's ear, so that the sound production component 1201 and the ear hook may clamp the user's ear from the front side and the rear side, thereby increasing a resistance preventing the earphone 10 from falling off from the ear and improving the wearing stability of the earphone 10.

Continuing to refer to FIGS. 19B and 19C, in some embodiments, the upper side wall 111 or the lower side wall 112 of the sound production component 1201 may also be inclined at a certain angle relative to the horizontal plane. However, when the upper side wall 111 or the lower side wall 112 is inclined at too large an angle relative to the horizontal plane, the sound production component 1201 may protrude out of the user's auricle, causing discomfort and instability in wearing the sound production component 1201. Therefore, to ensure that the sound production component 1201 covers the antihelix region to improve an intensity of a sound at the opening of the ear canal, and at the same time to ensure that the earphone has better wearing stability and comfort, when the earphone is worn in a wearing manner as shown in FIG. 19B and FIG. 19C, the distance from the mid-point C3 of the projection of the end FE of the sound production component 1201 on the sagittal plane of the user to the projection of the inner contour 1014 of the auricle on the sagittal plane of the user is in a range of 0 mm-15 mm. It should be noted that the sound production component 1201 of the earphone shown in FIG. 15 may also not cover the antihelix region, such as a wearing position shown in FIG. 19E, where the sound production component 1201 does not extend into the concha cavity, but is disposed toward the outer sidewall of the user's ear in suspension relative to the user's concha cavity, i.e., the sound production component 1201 itself plays the role of the baffle, and the larger the overlapping ratio between the projection area of the sound production component 1201 and the projection area of the concha cavity on the sagittal plane of the user, the closer the sound production component 1201 to the opening of the ear canal, and the greater the listening volume at the opening of the user's ear canal. The distance from the projection of the end of the sound production component 1201 on the sagittal plane of the user to the projection of the edge of the concha cavity on the sagittal plane of the user is positively correlated to the overlapping ratio between the projection area of the sound production component 1201 and the projection area of the concha cavity on the sagittal plane of the user, and a position of the sound outlet hole of the sound production component 1201 relative to the opening of the ear canal is positively correlated with the distance from the projection of the end of the sound production component 1201 on the sagittal plane of the user to the projection of the edge of the concha armor cavity on the sagittal plane of the user. Specific illustrations are provided below in connection with FIG. 20.

Figure 20:
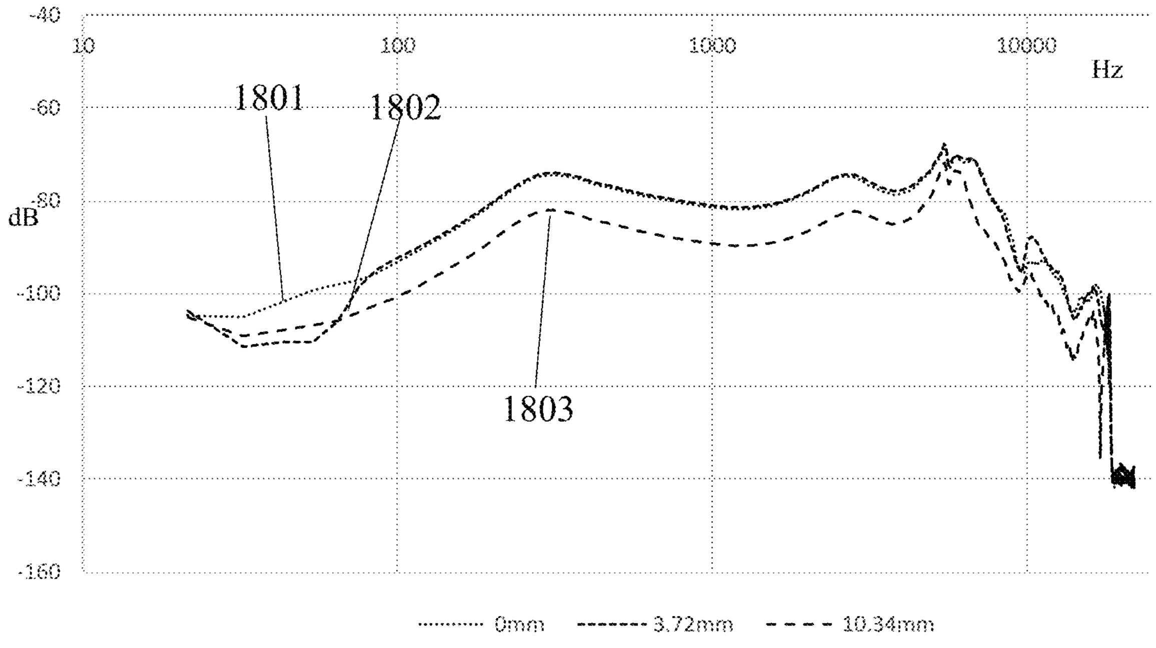
FIG. 20 is a schematic diagram illustrating frequency response curves corresponding to different distances between a projection of an end of a sound production component on a sagittal plane shown in FIG. 19E and a projection of an edge of a concha cavity on the sagittal plane according to some embodiments of the present disclosure.

FIG. 20 is a schematic diagram illustrating frequency response curves corresponding to different distances between a projection of an end of the sound production component 1201 on a sagittal plane of a user and a projection of an edge of a concha cavity on the sagittal plane of the user. Referring to FIG. 20, a horizontal coordinate indicates a frequency (Hz), a vertical coordinate indicates a sound pressure level (dB) at an opening of an ear canal at different frequencies, a curve 1801 is a frequency response curve when the distance from the projection of the end of the sound production component 1201 on the sagittal plane of the user to the projection of the edge of the concha cavity on the sagittal plane of the user is 0, a curve 1802 is a frequency response curve when the distance from the projection of the end of the sound production component 1201 on the sagittal plane of the user to the projection of the edge of the concha cavity on the sagittal plane of the user is 3.72 mm, and a curve 1803 is a frequency response curve when the distance from the projection of the end of the sound production component 1201 on the sagittal plane of the user to the projection of the edge of the concha cavity on the sagittal plane of the user is 10.34 mm. According to FIG. 20, a frequency response when the distance from the projection of the end of the sound production component 1201 on the sagittal plane of the user to the projection of the edge of the concha cavity on the sagittal plane of the user is 0 mm and 3.72 mm, respectively is better than that of 10.34 mm. Based on this, in some embodiments, to ensure that the earphone 10 has a better listening effect, the distance from the projection of the end FE of the sound production component 1201 on the sagittal plane of the user to the projection of the edge of the concha cavity on the sagittal plane of the user may be not greater than 10.34 mm. Further, the distance from the projection of the end FE of the sound production component 1201 on the sagittal plane of the user to the projection of the edge of the concha cavity on the sagittal plane of the user may be in a range of 0 mm-7 mm. Furthermore, the distance from the projection of the end FE of the sound production component 1201 on the sagittal plane of the user to the projection of the edge of the concha cavity on the sagittal plane of the user may be in a range of 0 mm-5 mm. Further, the distance from the projection of the end FE of the sound production component 1201 on the sagittal plane of the user to the projection of the edge of the concha cavity on the sagittal plane of the user may be in a range of 0 mm-3.72 mm. It is to be noted that, in a specific scenario, points other than the mid-point C3 of the projection of the end FE of the sound production component 1201 on the sagittal plane of the user may abut against the edge of the concha cavity, and at this time, the distance from the mid-point C3 of the projection of the end FE of the sound production component 1201 on the sagittal plane of the user to the edge of the concha cavity on the sagittal plane of the user may be greater than 0 mm. In some embodiments, the distance from the mid-point C3 of the projection of the end FE of the sound-producing portion 1201 on the sagittal plane of the user to the projection of the edge of the concha cavity on the sagittal plane of the user may be in a range of 2 mm-7 mm. Further, the distance from the mid-point C3 of the projection of the end FE of the sound production component 1201 on the sagittal plane of the user to the edge of the concha cavity on the sagittal plane of the user may be in a range of 2 mm-3.74 mm. It is to be noted that the frequency response curves corresponding to the different distances between the mid-point C3 of the projection of the end FE of the sound production component 1201 on the sagittal plane of the user and the projection of the edge of the concha cavity on the sagittal plane of the user in some embodiments of the present disclosure are measured by changing a wearing position (e.g., moving the sound production component 1201 along the sagittal axis) of the sound production component 1201 when a wearing angle of the sound production component 1201 (an angle between the upper sidewall or the lower sidewall and the horizontal direction, e.g., the angle between the upper sidewall and the horizontal direction is 0°), a size along the long-axis direction, a size along the long-axis direction, a size along the thickness direction of the sound production component 11 are constant.

In some embodiments, if the distance from the projection of the end of the sound production component 1201 to the projection of the edge of the concha cavity is in a suitable range, a better sound production efficiency may be obtained, and on this basis, a size of a transducer or a battery may be appropriately reduced, which may reduce a ratio of the sixth area to the projection area of the auricle on the sagittal plane of the user. In some embodiments, the distance from the projection of the end of the sound production component 1201 to the projection of the edge of the concha cavity is not greater than 8 mm, and the ratio of the sixth area to the projection area of the auricle on the sagittal plane of the user is in a range of 0.3-0.5. Further, to enable the sound production component 11 to form a more desirable cavity-like structure with the concha cavity, the distance from the projection of the end of the sound production component 1201 to the projection of the edge of the concha cavity may be in a range of 0 mm-5.5 mm, and the ratio of the sixth area to the projection area of the auricle on the sagittal plane of the user is in a range of 0.35-0.46, so as to ensure the listening effect when at least a portion of the sound production component covers the antihelix.

Continuing to refer to FIG. 19A to FIG. 19C, when a size of the sound production component 1201 and the user's auricle are constant, and an inclination angle of the sound production component 1201 relative to the horizontal direction is constant in the wearing state, a distance from the centroid O of the projection of the sound production component 1201 to the centroid Q of the projection of the opening (e.g., a dashed region 1016 shown in FIGS. 19A to 19E) of the ear canal on the sagittal plane of the user affects the baffling effect of the sound production component 1201 and the antihelix region and a position of the sound outlet hole of the sound production component 1201 relative to the opening of the ear canal, which further affects an intensity of a sound at the opening of the ear canal. For example, the smaller the distance from the centroid O of the first projection of the sound production component 1201 on the sagittal plane of the user to the centroid Q of the projection of the opening of the ear canal on the sagittal plane of the user, the smaller the contacting region between the sound production component 1201 and the antihelix region, and the weaker the baffling effect formed by the sound production component 1201 and the antihelix region. However, an increase in an overlapping ratio between the projection area of the first projection of the sound production component 1201 on the sagittal plane of the user and the projection area of the concha cavity on the sagittal plane of the user implies that the sound outlet hole of the sound production component 1201 is closer to the opening of the ear canal, which also increases the listening effect at the opening of the ear canal. Therefore, under the premise that the overall volume and wearing manner of the sound production component 1201 are constant, the distance from the centroid O of the first projection of the sound production component 1201 on the sagittal plane of the user to the centroid Q of the projection of the opening of the ear canal on the sagittal plane of the user also needs to be considered.

Figure 21A:
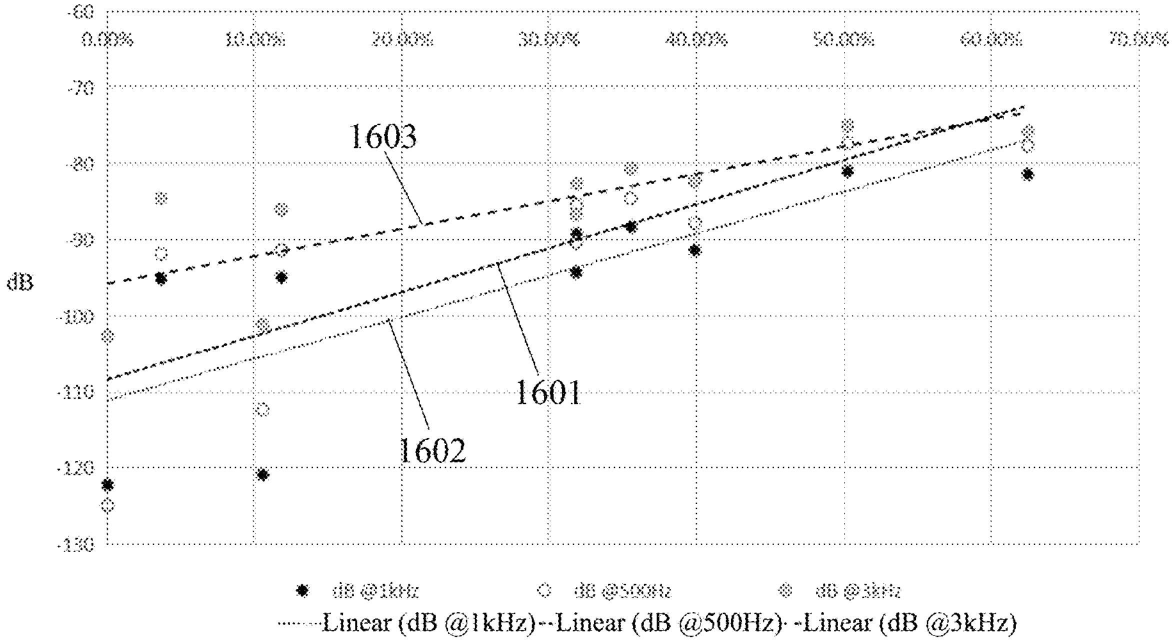
FIG. 21A is a schematic diagram illustrating frequency response curves corresponding to different overlapping ratios between a projection area of a sound production component and a projection area of a user's concha cavity on a sagittal plane when the sound production component does not extend into the concha cavity according to some embodiments of the present disclosure.
Figure 21B:
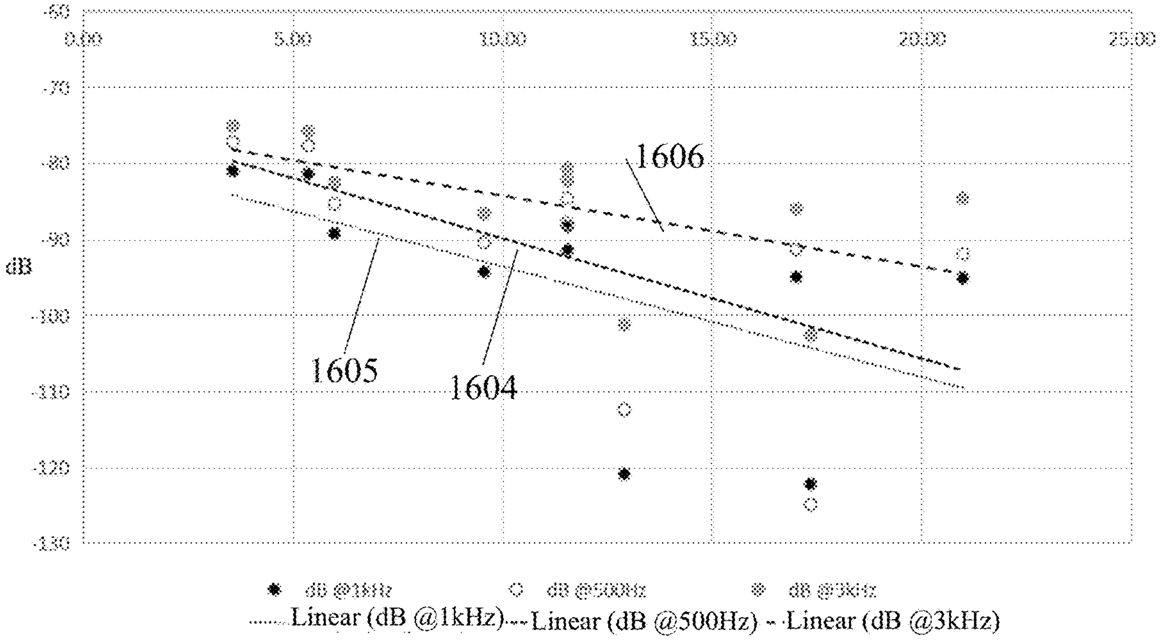
FIG. 21B is a schematic diagram illustrating frequency response curves corresponding to different distances between a centroid of a first projection of a sound production component and a centroid of a projection of an opening of an ear canal on a sagittal plane when the sound production component does not extend into the concha cavity according to some embodiments of the present disclosure.

FIG. 21A is a schematic diagram illustrating frequency response curves corresponding to different overlapping ratios between a projection area of the sound production component 1201 and a projection area of a concha cavity when the sound production component 1201 does not extend into the concha cavity in a wearing state according to other embodiments of the present disclosure. FIG. 21B is a schematic diagram illustrating frequency response curves corresponding to different distances between a centroid of a projection of the sound production component 1201 and a centroid of a projection of an opening of an ear canal on a sagittal plane of a user when the sound production component 1201 does not extend into the concha cavity in a wearing state according to some embodiments of the present disclosure.

Referring to FIG. 21A, wherein a horizontal coordinate is the overlapping ratio between the projection area of the sound production component 1201 to the projection area of the concha cavity on the sagittal plane of the user, a vertical coordinate is a sound pressure level of a sound at the opening of the ear canal corresponding to different overlapping ratios, and a straight line 1601 represents a linear relationship obtained by fitting an overlapping ratio between a projection area of the first projection and the projection area of the concha cavity on the sagittal plane of the user and the sound pressure level at the opening of the ear canal at a frequency of 500 Hz; a straight line 1602 represents a linear relationship obtained by fitting the overlapping ratio between the projection area of the first projection and the projection area of the concha cavity on the sagittal plane of the user and a sound pressure level at the opening of the ear canal at a frequency of 1 kHz; and a straight line 1603 represents a linear relationship obtained by fitting the overlapping ratio between the projection area of the first projection and the projection area of the concha cavity on the sagittal plane of the user and a sound pressure level at the opening of the ear canal at a frequency of 3 kHz. Hollow circular dots in FIG. 21A represent test data corresponding to different overlapping ratios between the projection area of the first projection and the projection area of the concha cavity on the sagittal plane of the user at a frequency of 500 Hz; black circular dots in FIG. 21A represent test data corresponding to different overlapping ratios between the projection area of the first projection and the projection area of the concha cavity on the sagittal plane of the user at a frequency of 1 Hz; circular dots in lighter grey in FIG. 21A represent test data corresponding to different overlapping ratios between the projection area of the first projection and the projection area of the concha cavity on the sagittal plane of the user at a frequency of 3 kHz. According to FIG. 21A, at different frequencies, the overlapping ratio between the projection area of the first projection and the projection area of the concha cavity on the sagittal plane of the user varies approximately linearly with the sound pressure level at the opening of the user's ear canal. When the overlapping ratio between the projection area of the sound production component 1201 and the projection area of the concha cavity on the sagittal plane of the user is greater than 10%, the sound measured at the opening of the ear canal at a particular frequency (e.g., 500 Hz, 1 kHz, 3 kHz) has a significant enhancement compared to the case when the projection area of the sound production component 1201 and the projection area of the concha cavity on the sagittal plane of the user do not overlap with each other (the overlapping ratio is 0). Additionally, too large an overlapping ratio between the projection area of the sound production component 1201 and the projection area of the concha cavity on the sagittal plane of the user may affect the opening of the ear canal, which may affect the user's ability to access a sound in an external environment. Therefore, the overlapping ratio between the projection area of the sound production component 1201 and the projection area of the concha cavity on the sagittal plane of the user should not be too large, for example, the overlapping ratio between the projection area of the sound production component 11 and the projection area of the concha cavity on the sagittal plane of the user is not greater than 62%. Based on this, to ensure the acoustic output quality of the sound production component 1201, the overlapping ratio between the projection area of the sound production component 1201 and the projection area of the concha cavity on the sagittal plane of the user may be in a range of 10%-60%. Further, the overlapping ratio between the projection area of the sound production component 1201 and the projection area of the ear armor cavity on the sagittal plane of the user may be in a range of 10%-45%. Furthermore, the overlapping ratio between the projection area of the sound production component 1201 and the projection area of the ear armor cavity on the sagittal plane of the user may be in a range of 11.82%-40%. Furthermore, the overlapping ratio between the projection area of the sound production component 1201 and the projection area of the ear armor cavity on the sagittal plane of the user may be in a range of 18%-38%. Furthermore, the overlapping ratio between the projection area of the sound production component 1201 and the projection area of the ear armor cavity on the sagittal plane of the user may be in a range of 25%-38%.

Referring to FIG. 21B, a horizontal coordinate is a distance from the centroid O of the projection of the sound production component 1201 to the centroid Q of the projection of the opening of the ear canal on the sagittal plane of the user, and a vertical coordinate is a sound pressure level of a sound at the opening of the ear canal corresponding to different distances. A straight line 1604 represents a linear relationship between the distance from the centroid O of the projection of the sound production component 1201 to the centroid Q of the projection of the opening of the ear canal on the sagittal plane of the user and a sound pressure level at the opening of the ear canal at a frequency of 500 Hz in an ideal state; a straight line 1605 represents a linear relationship between the distance from the centroid O of the projection of the sound production component 1201 to the centroid Q of the projection of the opening of the ear canal on the sagittal plane of the user and a sound pressure level at the opening of the ear canal at a frequency of 1 kHz; and a straight line 1606 represents a linear relationship between the distance from the centroid O of the projection of the sound production component 1201 to the centroid Q of the projection of the opening of the ear canal on the sagittal plane of the user and a sound pressure level at the opening of the ear canal at a frequency of 3 kHz. Hollow circular dots in FIG. 21B show test data corresponding to the different distances between the centroid O of the projection of the sound production component 1201 and the centroid Q of the projection of the opening of the ear canal on the sagittal plane of the user at a frequency of 500 Hz; black circular dots in FIG. 21B show test data corresponding to the different distances between the centroid O of the projection of the sound production component 1201 and the centroid Q of the projection of the opening of the ear canal on the sagittal plane of the user at a frequency of 1 kHz; and circular dots in lighter gray in FIG. 21B show test data corresponding to the different distances between the centroid O of the projection of the sound production component 1201 and the centroid Q of the projection of the opening of the ear canal on the sagittal plane of the user at a frequency of 3 kHz. According to FIG. 21B, at different frequencies, the distance from the centroid O of the projection of the sound production component 1201 to the centroid Q of the projection of the opening of the ear canal on the sagittal plane of the user is negatively correlated to the sound pressure level at the opening of the user's ear canal. A sound pressure level of a sound measured at the opening of the ear canal at a specific frequency (e.g., 500 Hz, 1 kHz, 3 kHz) tends to decrease as the distance from the centroid O of the projection of the sound production component 1201 to the centroid Q of the projection of the opening of the ear canal on the sagittal plane of the user increases. In combination with FIGS. 21A and 21B, the larger the distance from the centroid O of the projection of the sound production component 1201 to the centroid Q of the projection of the opening of the ear canal on the sagittal plane of the user, the smaller the overlapping ratio between the projection area of the sound production component 1201 and the projection area of the opening of the ear canal on the sagittal plane of the user. The overlapping ratio affects a position of the sound outlet hole of the sound production component 1201 relative to the opening of the ear canal. For example, the greater the distance from the centroid O of the projection of the sound production component 1201 to the centroid Q of the projection of the opening of the ear canal on the sagittal plane of the user, the greater the overlapping ratio, the sound outlet hole of the sound production component 1201 is closer to the opening of the ear canal, and the listening effect at the opening of the ear canal is better. Additionally, if the distance from the centroid O of the projection of the sound production component 1201 to the centroid Q of the projection of the opening of the ear canal on the sagittal plane of the user is too small, the overlapping ratio between the projection area of the sound production component 1201 and the projection area of the opening of the ear canal opening on the sagittal plane of the user may be too large, and the sound production component 1201 may cover the opening of the ear canal of the user, which may affect the user's access to sound and information in an external environment. According to FIG. 21B, taking a frequency of 3 kHz as an example, when the distance from the centroid O of the projection of the sound production component 1201 to the centroid Q of the projection of the opening of the ear canal on the sagittal plane of the user is 4 mm, 5.8 mm, and 12 mm, respectively, the sound pressure level measured at the opening of the ear canal is ~73 dB, ~76 dB, and ~82 dB, respectively, and when the distance from the centroid O of the projection of the sound production component 1201 to the centroid Q of the projection of the opening of the ear canal on the sagittal plane of the user is 17 mm and 22 mm, respectively, the sound pressure level measured at the opening of the ear canal is ~85 dB and ~83 dB, respectively. In such cases, the distance from the centroid O of the projection of the sound production component 1201 to the centroid Q of the projection of the opening of the ear canal on the sagittal plane of the user should not be too large. In some embodiments, to make the earphone has a better acoustic output quality in a wearing state (e.g., a sound pressure level is greater than ~82 dB at the opening of the ear canal) and ensure that the user can receive the sound and information in the external environment, the distance from the centroid O of the projection of the sound production component 1201 to the centroid Q of the projection of the opening of the ear canal on the sagittal plane of the user may be in a range of 3 mm-13 mm. Further, the distance from the centroid O of the projection of the sound production component 1201 to the centroid Q of the projection of the opening of the ear canal on the sagittal plane of the user may be in a range of 4 mm-10 mm. Furthermore, the distance from the centroid O of the projection of the sound production component 1201 to the centroid Q of the projection of the opening of the ear canal on the sagittal plane of the user may be in a range of 4 mm-7 mm. Further, the distance from the centroid O of the projection of the sound production component 1201 to the centroid Q of the projection of the opening of the ear canal on the sagittal plane of the user may be in a range of 4 mm-6 mm.

In some embodiments, the distance from the centroid O of the projection of the sound production component 1201 to the centroid Q of the projection of the opening of the ear canal on the sagittal plane of the user may be in a suitable range allows for higher sound production efficiency. On this basis, a size of a transducer or a battery may be appropriately reduced, which may reduce the ratio of the sixth area to the projection area of the auricle on the sagittal plane of the user. In some embodiments, to enable the sound production component 11 to form a more desirable cavity-like structure with the concha cavity, the distance from the centroid O of the projection of the sound production component 1201 to the centroid Q of the projection of the opening of the ear canal on the sagittal plane of the user be in a range of 4 mm-7 mm, and the ratio of the second area to the projection area of the auricle on the sagittal plane of the user may be in a range of 0.3-0.5. Further, the distance from the centroid O of the projection of the sound production component 1201 to the centroid Q of the projection of the opening of the ear canal on the sagittal plane of the user may be in a range of 4 mm-6 mm, and the ratio of the second area to the projection area of the auricle on the sagittal plane of the user may be in a range of 0.32-0.45. In such cases, a baffle is formed between at least a portion of the sound production component 1201 and the antihelix region, which is more conducive to increasing an intensity of a sound at the opening of the ear canal and ensuring the listening effect.

It should be noted that the frequency response curves corresponding to different overlapping ratios and the frequency response curves corresponding to the different distances between the centroid of the first projection and the centroid of the projection of the opening of the ear canal on the sagittal plane of the user are measured by changing the wearing position of the sound production component 11 (e.g., moving in the sagittal axis direction) when a wearing angle (an angle between an upper sidewall or a lower sidewall and the horizontal direction, e.g., the angle between the upper sidewall and the horizontal direction is 0°) and a size of the sound production component 1201 are constant.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

The specific embodiments documented in the present disclosure are merely exemplary, and one or more technical features in the specific embodiments are optional or additional, and are not the necessary technical features constituting the inventive conception of the present disclosure. In other words, the scope of protection of the present disclosure encompasses is much broader than the specific embodiments.

At the same time, the present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various portions of this present disclosure are not necessarily all referring to the same embodiment. In addition, certain features, structures or characteristics of one or more embodiments of the present disclosure may be suitably combined.

In the same way, it should be noted that in order to simplify the expression disclosed in the present disclosure and help the understanding of one or more embodiments of the invention, in the foregoing description of the embodiments of the present disclosure, sometimes multiple features are combined into one embodiment, drawings or descriptions thereof. However, this disclosure method does not mean that the characteristics of the characteristics required for the present disclosure are more than the characteristics mentioned in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other deformations may also fall within the scope of the present disclosure. Therefore, merely by way of example and not limitation, alternative configurations of the embodiments of the present disclosure may be considered consistent with the teachings of the present disclosure. Accordingly, the embodiments of the present disclosure are not limited to the embodiments expressly presented and described herein.

What is claimed is:

1. An earphone, comprising:

a sound production component, at least a portion of the sound production component extending into a concha cavity of a user; and an ear hook, the ear hook being disposed between an ear auricle and a head of the user, extending toward a side of the ear auricle away from the head, and connecting the sound production component, and the ear hook being configured to place the sound production component at a position near an ear canal of the user without blocking an opening of the ear canal;

wherein, in a non-wearing state, the ear hook and the sound production component form a first projection on a first plane, the first projection comprising an outer contour, a first end contour, an inner contour, and a second end contour, the outer contour of the first projection, the first end contour of the first projection, the second end contour of the first projection, and a tangent segment connecting the first end contour and the second end contour define a first closed curve, and a ratio of a projection area of the sound production component on the first plane to a first area of the first closed curve is between 0.25 and 0.4.

2. The earphone of claim 1, wherein the first area ranges from 1000 $mm^2$ to 1500 $mm^2$, and the projection area of the sound production component on the first plane ranges from 202 $mm^2$ to 560 $mm^2$.

3. The earphone of claim 1, wherein in the non-wearing state, the inner contour, the first end contour, the second end contour, and the tangent segment connecting the first end contour and the second end contour define a third closed curve, and a ratio of the projection area of the sound production component on the first plane to a third area of the third closed curve is between 0.67 and 1.06.

4. The earphone of claim 1, wherein in the non-wearing state, a ratio of the projection area of the sound production component on the first plane to a projection area of the earphone on the first plane is in a range of 0.35 to 0.59.

5. The earphone of claim 1, wherein:

in a wearing state, the ear hook and the sound production component form a second projection on a sagittal plane of the user, the second projection comprising an outer contour, a first end contour, an inner contour, and a second end contour, and the outer contour of the second projection, the first end contour of the second projection, the second end contour of the second projection, and a tangent segment connecting the first end contour of the second projection and the second end contour of the second projection define a second closed curve; and a ratio of the projection area of the sound production component on the first plane to a second area of the second closed curve is between 0.2 and 0.35.

6. The earphone of claim 5, wherein, in the wearing state, the inner contour of the second projection, the first end contour of the second projection, the second end contour of the second projection, and the tangent segment connecting the first end contour of the second projection and the second end contour of the second projection define a fourth closed curve; and a ratio of the projection area of the sound production component on the first plane to a fourth area of the fourth closed curve is between 0.51 and 0.72.

7. The earphone of claim 5, wherein a ratio of the projection area of the sound production component on the first plane to a projection area of the auricle on the sagittal plane of the user is in a range of 0.15 to 0.33.

8. The earphone of claim 5, wherein in the wearing state, an overlapping ratio of a projection area of the sound production component on the sagittal plane of the user to a projection area of the concha cavity on the sagittal plane of the user is not less than 44.01%; and a ratio of the second area to a projection area of the auricle on the sagittal plane of the user ranges from 0.8 to 1.1.

9. The earphone of claim 5, wherein in the wearing state, a ratio of an overlapping area between a projection of the sound production component on the sagittal plane of the user and a projection of the concha cavity on the sagittal plane of the user to a projection area of the sound production component on the sagittal plane of the user is not less than 42.16%; and a ratio of the second area to a projection area of the auricle on the sagittal plane of the user ranges from 0.8 to 1.1.

10. The earphone of claim 5, wherein in the wearing state, a distance from a projection of an end of the sound production component on the sagittal plane to a projection of an edge of the concha cavity on the sagittal plane is not greater than 16 mm; and a ratio of the second area to a projection area of the auricle on the sagittal plane of the user ranges from 0.8 to 1.1.

11. The earphone of claim 5, wherein in the wearing state, a distance from a centroid of a projection of the sound production component on the sagittal plane of the user to a centroid of a projection of the opening of the ear canal on the sagittal plane of the user ranges from 8 mm to 12 mm; and a ratio of the second area to a projection area of the auricle on the sagittal plane of the user ranges from 0.8 to 1.1.

12. An earphone, comprising:

a sound production component, at least a portion of the sound production component covering an antihelix region of a user; and an ear hook, the ear hook being disposed between an auricle and a head of the user, extending toward a side of the auricle away from the head, and connecting the sound production component, the ear hook being configured to place the sound production component at a position near an ear canal of the user without blocking an opening of the ear canal;

wherein, in a non-wearing state, the ear hook and the sound production component form a fifth projection on a first plane, the fifth projection comprising an outer contour, a first end contour, an inner contour, and a second end contour, the outer contour of the fifth projection, the first end contour of the fifth projection, the second end contour of the fifth projection, and a tangent segment connecting the first end contour and the second end contour define a fifth closed curve; and a ratio of a projection area of the sound production component on the first plane to a fifth area of the fifth closed curve is between 0.4 and 0.75.

13. The earphone of claim 12, wherein the fifth area ranges from 400 $mm^2$ to 800 $mm^2$, and the projection area of the sound production component on the first plane ranges from 236 $mm^2$ to 565 $mm^2$.

14. The earphone of claim 12, wherein in the non-wearing state, a ratio of the projection area of the sound production component on the first plane to a projection area of the earphone on the first plane is in a range of 0.4 to 0.65.

15. The earphone of claim 12, wherein a ratio of the projection area of the sound production component on the first plane to a projection area of the auricle on a sagittal plane of the user is in a range of 0.17 to 0.35.

16. The earphone of claim 12, wherein in a wearing state, the ear hook and the sound production component form a sixth projection on a sagittal plane of the user, the sixth projection includes an outer contour, a first end contour, an inner contour, and a second end contour, and the outer contour of the sixth projection, the first end contour of the sixth projection, the second end contour of the sixth projection, and a tangent segment connecting the first end contour of the sixth projection and the second end contour of the sixth projection define a sixth closed curve; and a ratio of the projection area of the sound production component on the first plane to a sixth area of the sixth closed curve ranges from 0.35 to 0.75.

17. The earphone of claim 16, wherein in the wearing state, an overlapping ratio of a projection area of the sound production component on the sagittal plane of the user and a projection area of the concha cavity on the sagittal plane of the user is not less than 11.82%; and a ratio of the sixth area to a projection area of the auricle on the sagittal plane of the user ranges from 0.3 to 0.5.

18. The earphone of claim 16, wherein in the wearing state, a ratio of an overlapping area between a projection of the sound production component on the sagittal plane of the user and a projection of the concha cavity on the sagittal plane of the user to a projection area of the sound production component on the sagittal plane of the user is not less than 11.18%; and a ratio of the sixth area to a projection area of the auricle on the sagittal plane of the user ranges from 0.3 to 0.5.

19. The earphone of claim 16, wherein in the wearing state, a distance from a projection of an end of the sound production component on the sagittal plane of the user to a projection of an inner contour of the auricle on the sagittal plane of the user is not greater than 8 mm; and a ratio of the sixth area to a projection area of the auricle on the sagittal plane of the user ranges from 0.3 to 0.5.

20. The earphone of claim 16, wherein in the wearing state, a distance from a centroid of a projection of the sound production component on the sagittal plane of the user to a centroid of a projection of the opening of the ear canal on the sagittal plane of the user is in a range of 4 mm to 7 mm; and a ratio of the sixth area to a projection area of the auricle on the sagittal plane of the user ranges from 0.3 to 0.5.

* * * * *